United States Patent
Lee et al.

(10) Patent No.: US 10,715,761 B2
(45) Date of Patent: Jul. 14, 2020

(54) METHOD FOR PROVIDING VIDEO CONTENT AND ELECTRONIC DEVICE FOR SUPPORTING THE SAME

(71) Applicant: Samsung Electronics Co., Ltd., Suwon-si, Gyeonggi-do (KR)

(72) Inventors: Woo Yong Lee, Hwaseong-si (KR); Byung Hyun Min, Yongin-si (KR); Hyoung Jin Yoo, Suwon-si (KR); Gyu Bong Lee, Suwon-si (KR); In Pyo Lee, Bucheon-si (KR); Jeong Yong Park, Suwon-si (KR); Jong Hoon Won, Suwon-si (KR); Ki Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/650,374

(22) Filed: Jul. 14, 2017

(65) Prior Publication Data
US 2018/0035075 A1 Feb. 1, 2018

(30) Foreign Application Priority Data
Jul. 29, 2016 (KR) ........................ 10-2016-0096869

(51) Int. Cl.
*H04N 5/783* (2006.01)
*H04N 5/77* (2006.01)
(Continued)

(52) U.S. Cl.
CPC .......... *H04N 5/783* (2013.01); *G11B 27/005* (2013.01); *G11B 27/034* (2013.01); *G11B 27/28* (2013.01);
(Continued)

(58) Field of Classification Search
USPC .................................................. 386/239–248
See application file for complete search history.

(56) References Cited

U.S. PATENT DOCUMENTS 8,081,255 B2    12/2011    Koshimizu et al.
8,154,606 B2    4/2012    Tokuyama
(Continued)

FOREIGN PATENT DOCUMENTS

EP    2 079 231 A1    7/2009
EP    2 129 105 A1    12/2009
(Continued)

OTHER PUBLICATIONS

"iPhone User Guide for iOS 7.1 Software",, Mar. 10, 2014, pp. 1-162, XP055207043, Retrieved from the Internet: https://manuals.info.apple.com/en_US/iphone_ios7 user_guide.pdf.
(Continued)

*Primary Examiner* — Hung Q Dang
(74) *Attorney, Agent, or Firm* — Jefferson IP Law, LLP

(57) ABSTRACT

An electronic device is provided. The electronic device includes a memory configured to store a high-speed video captured with a first number of frames per second and a processor configured to be electrically connected with the memory. The processor is configured to detect an amount of image variation based on at least one of the first number of frames and generate a slow motion interval, a playback time of which is extended, by dividing or sampling the first number of frames into a second number of frames which are less than the first number of frames with respect to a video interval having an amount of image variation which meets a specified condition.

19 Claims, 15 Drawing Sheets

(51) Int. Cl.
    *G11B 27/34*    (2006.01)
    *G11B 27/00*    (2006.01)
    *G11B 27/28*    (2006.01)
    *G11B 27/034*   (2006.01)
    *H04N 9/804*    (2006.01)
    *H04N 5/232*    (2006.01)

(52) U.S. Cl.
    CPC ......... *G11B 27/34* (2013.01); *H04N 5/23216* (2013.01); *H04N 5/23229* (2013.01); *H04N 5/23267* (2013.01); *H04N 5/772* (2013.01); *H04N 9/8042* (2013.01)

(56) References Cited

U.S. PATENT DOCUMENTS

| | | | |
|---|---|---|---|
| 8,363,117 | B2 | 1/2013 | Trumbull et al. |
| 8,422,868 | B2 | 4/2013 | Kuriyama |
| 8,620,142 | B2 | 12/2013 | Morikawa |
| 8,682,134 | B2 | 3/2014 | Otani |
| 8,687,079 | B2 | 4/2014 | Kobayashi et al. |
| 8,872,942 | B2 | 10/2014 | Miyakawa |
| 8,903,222 | B2 | 12/2014 | Miyakoshi |
| 9,013,583 | B2 | 4/2015 | Tokuyama |
| 9,071,813 | B2 | 6/2015 | Kobayashi et al. |
| 9,137,481 | B2 | 9/2015 | Miyakawa |
| 9,609,298 | B2 | 3/2017 | Kobayashi et al. |
| 2007/0091204 | A1 | 4/2007 | Koshimizu et al. |
| 2009/0290848 | A1* | 11/2009 | Brown ........... H04N 5/232 386/223 |
| 2010/0060752 | A1 | 3/2010 | Tokuyama |
| 2010/0092151 | A1 | 4/2010 | Miyakoshi |
| 2010/0157090 | A1 | 6/2010 | Kobayashi et al. |
| 2010/0226622 | A1 | 9/2010 | Morikawa |
| 2010/0259627 | A1 | 10/2010 | Trumbull et al. |
| 2011/0051991 | A1* | 3/2011 | Neuman ........... G11B 27/034 382/100 |
| 2011/0293244 | A1 | 12/2011 | Kuriyama |
| 2012/0133791 | A1 | 5/2012 | Tokuyama |
| 2012/0189287 | A1 | 7/2012 | Otani |
| 2012/0249854 | A1 | 10/2012 | Miyakawa |
| 2013/0188921 | A1 | 7/2013 | Kuriyama |
| 2014/0161424 | A1 | 6/2014 | Kobayashi et al. |
| 2015/0010285 | A1 | 1/2015 | Miyakawa |
| 2015/0071605 | A1* | 3/2015 | Ogawa ............. G11B 27/005 386/241 |
| 2015/0139627 | A1 | 5/2015 | Kawashita et al. |
| 2015/0221335 | A1 | 8/2015 | Licata |
| 2015/0271462 | A1 | 9/2015 | Kobayashi et al. |
| 2016/0140733 | A1 | 5/2016 | Gu et al. |
| 2016/0322078 | A1* | 11/2016 | Bose ................. G11B 27/031 |
| 2016/0330422 | A1 | 11/2016 | Kuriyama |
| 2017/0094191 | A1 | 3/2017 | Hashizume |

FOREIGN PATENT DOCUMENTS

| | | |
|---|---|---|
| EP | 2 164 257 A1 | 3/2010 |
| KR | 10-0899046 B1 | 5/2009 |
| WO | 2015/146644 A1 | 10/2015 |

OTHER PUBLICATIONS

European Office Action dated Jul. 12, 2019, issued in European Patent Application No. 17182391.7-1208.

\* cited by examiner

METHOD FOR PROVIDING VIDEO CONTENT AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Jul. 29, 2016 in the Korean Intellectual Property Office and assigned Serial number 10-2016-0096869, the entire disclosure of which is hereby incorporated by reference.

TECHNICAL FIELD

The present disclosure relates to video content.

BACKGROUND

An electronic device may collect an image using its camera. For example, a conventional electronic device may collect a still image or a moving image using its camera. The collected image may be output on a display.

The above-mentioned conventional electronic device may provide a high-speed video capture function for capturing a video at a high speed. This conventional electronic device may simply provide only a function of storing a video captured at a high speed, or playing back the video or transmitting the video to a server or the like according to a user request.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for providing video content to automatically extract a meaningful interval (or an interval with constant meaning) in a video captured at a high speed and provide the extracted interval with a slow motion and an electronic device for supporting the same.

In accordance with an aspect of the present disclosure, an electronic device is provided. The electronic device includes a memory configured to store a high-speed video captured with a first number of frames per second and a processor electrically connected with the memory and configured to detect an amount of image variation based on at least one of the first number of frames and generate a slow motion interval, a playback time of which is extended, by dividing the first number of frames into a second number of frames which are less than the first number of frames with respect to at least part of the video or generate a slow motion interval, a playback time of which is extended, by sampling at least some frames of the first number of frames, with respect to the at least part of the video.

In accordance with another aspect of the present disclosure, an electronic device is provided. The electronic device includes a memory configured to store a high-speed video captured with a first number of frames per second and a processor electrically connected with the memory and configured to obtain information of an amount of image variation based on at least one of the first number of frames, detect a plurality of intervals where the amount of image variation of a level or more is continuous by a length and generate a plurality of slow motion intervals, a playback time of which is extended, by dividing the first number of frames into a second number of frames which are less than the first number of frames, with respect to the plurality of detected intervals, or generate a plurality of slow motion intervals, a playback time of which is extended, by sampling at least some frames of the first number of frames, with respect to the plurality of detected intervals.

In accordance with another aspect of the present disclosure, a method for providing video content is provided. The method for providing video content includes obtaining information of an amount of image variation using some of a first number of frames per second from a high-speed video captured with the first number of frames per second, detecting an interval having an amount of image variation which meets a condition and generating a slow motion interval, a playback time of which is extended, by dividing the first number of frames into a second number of frames which are less than the first number of frames, with respect to the interval or generating a slow motion interval, a playback time of which is extended, by sampling at least some frames of the first number of frames, with respect to the interval.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
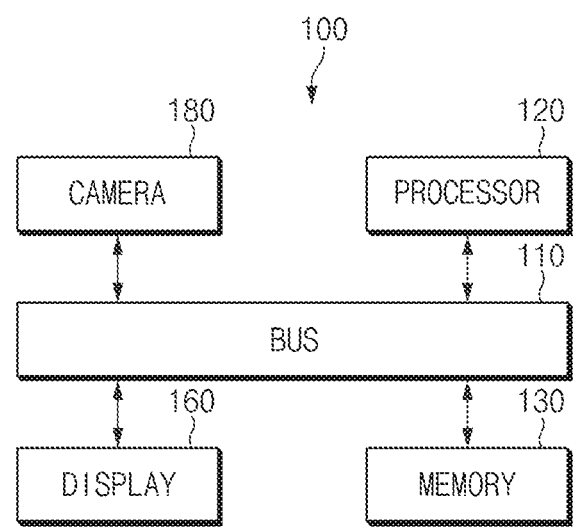
FIG. 1 is a block diagram illustrating an example of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

FIG. 1 is a block diagram illustrating an example of an electronic device according to an embodiment of the present disclosure.

Referring to FIG. 1, at least one of a processor 120, a memory 130, a display 160, and a camera 180 may be located in at least one of, for example, an inner side or an outer side of a housing of an electronic device 100 according to an embodiment of the present disclosure. The electronic device 100 may include a bus 110 which electrically connects the elements. Additionally or alternatively, the electronic device 100 may further include a communication interface which may communicate with an external electronic device and a sensor (e.g., an acceleration sensor, a geomagnetic sensor, or the like) which may sense motion or movement of the electronic device 100.

At least part of a first surface which faces, for example, a first direction in the housing may be opened, and at least part of a region where a screen is displayed on the display 160 may be exposed via the opened first surface. The housing may include a second surface which faces a second direction (e.g., a direction opposite to the first direction) and may include at least one sidewall which covers the first surface and an edge side portion of the second surface. The processor 120 and the memory 130 may be mounted on at least one printed circuit board (PCB), and the PCB may be located at an inner side of the housing. At least part of the camera 180 may be located at an inner side of the housing. At least part of a lens part associated with image capture may be exposed to the outside via a hole formed at one side of the housing.

The bus 110 may electrically connect the processor 120, the memory 130, the display 160, and the camera 180 with each other. For example, the bus 110 may transmit an instruction of the processor 120 to the camera 180 or may transmit an image obtained by the camera 180 (e.g., a general video captured at a first specified speed or a high-speed video captured at a second specified speed) to the processor 120. According to an embodiment, the bus 110 may support to transmit a signal to output a preview image by transmitting some of frames of an image obtained by the camera 180 to the display 160.

The processor 120 may transmit and process a signal associated with operating the electronic device 100. The processor 120 may include, for example, at least one AP associated with executing and operating an application of the electronic device 100. Alternatively, the processor 120 may include a graphic processing unit (GPU) associated with operating the camera 180. According to an embodiment, the processor 120 ma perform signal processing for collecting a general video (e.g., an image captured at a frame rate of a specified number of frames (e.g., 20 frames or 30 frames) or a high-speed video (e.g., an image captured at a frame rate of a first number of frames per second (e.g., a number of frames which are greater than the specified number of frames, for example, 180 to 240 frames)). Alternatively, the processor 120 may process a signal (e.g., an image or a frame) for providing a preview image (e.g., an image output on the display 160 at a frame rate of a constant number of frames per second (e.g., 15 frames per second)). The number of frames per second in the general video, the high-speed video, or the preview image may be relative and may vary according to a hardware characteristic of the electronic device 100, a user setting, or the like. In this regard, the processor 120 may support a general video capture function according to a default setting (or a start function) and may change the general video capture function to a high-speed video capture function according to a user input. Alternatively, the processor 120 may support the high-speed video capture function as a default setting and may change the high-speed video capture function to the general video capture function according to a user input.

According to an embodiment, in connection with the high-speed video capture function, the processor 120 may be configured to automatically generate a slow motion upon high-speed video capture according to a default setting or automatically generate and provide a slow motion according to a user selection. The processor 120 may output an icon or a menu item associated with a function of generating a slow motion on the display 160. If there is a user input associated with a request to generate a slow motion or if the processor 120 is configured to automatically generate a slow motion upon high-speed video capture, the processor 120 may assign an event (e.g., an indicator indicating a frame having an amount of variation of a specified level or more) according to an amount of image variation between obtained frames. The amount of image variation between the frames may be calculated based on, for example, an amount of variation in at least one object included in a frame. In this regard, the processor 120 may calculate an amount of variation by extracting at least one object included in a frame or selecting at least one frame according to a user input and applying object tracking to the extracted or selected frame.

The processor 120 may assign a score to each event based on a specified condition (e.g., a level of an amount of variation between assigned events) and may select at least one interval to generate a slow motion based on the assigned score. In this operation, the processor 120 may adjust at least one of the number of intervals to be extracted and a width of the intervals to be extracted, according to a specified condition. The processor 120 may generate a slow motion associated with a selected interval by adjusting frames corresponding to the selected interval to be played back at intervals of a specified time. The processor 120 may adjust a sampling condition of some of a plurality of frames (e.g., the number of sampled frames) in at least one interval which is not selected except for an interval associated with generating a slow motion and may perform processing (e.g., processing of a general playback interval) such that the interval is played back during a specified time. Through the above-mentioned operation, the processor 120 may provide video content including the general playback interval and at least one slow motion interval.

According to various embodiments, the processor 120 may provide an edit function for video content including the slow motion interval. In this regard, if receiving an input signal for selecting the video content including the slow motion interval or if receiving a user input associated with an edit request, the processor 120 may output an edit screen on the display 160 and may edit video content in response to the user input.

According to various embodiments, the processor 120 may measure an amount of image variation by comparing a constant number of sampled frames (e.g., 10 frames sampled among 240 frames obtained per second) while a high-speed video is captured and may store the measured amount of variation. If the capturing of the high-speed video is completed, the processor 120 may assign an event (e.g., an indicator indicating a frame having an amount of variation of a specified level or more) based on the measured amount of variation. The processor 120 may assign a relative score by relatively comparing the assigned events or may assign an absolute score according to an amount of variation based on specified reference values. The processor 120 may select an interval where scores of a constant reference value or more are distributed within specified density or an interval where the scores of the constant reference value or more are continuous as a slow motion interval. If receiving a request to play back the high-speed video, the processor 120 may play back an interval which is not selected as a slow motion interval at a first specified time speed (e.g., sample an image of 240 frames per second as 30 frames and play back the 30 frames for 1 second) and may play back the slow motion interval at a second specified time speed (e.g., divide an image of 240 frames per second every 30 frames and play back 30 frames for 8 seconds). 240 frames corresponding to the high-speed video may be replaced with 480 frames, 1280 frames, or the like according to a setting, and 30 frames which are criteria of the playback time speed may be replaced with 15 frames, 20 frames, 60 frames, or the like.

The memory 130 may store at least one instruction set associated with providing video content according to an embodiment. For example, the memory 130 may include an instruction set associated with capturing a general video or a high-speed video of the camera 180, an instruction set associated with obtaining (or detecting) an amount of image variation between frames of the high-speed video, an instruction set associated with performing scoring based on the detected amount of variation, an instruction set associated with selecting a slow motion interval according to the assigned score and a specified condition, and an instruction set associated with generating a slow motion for the selected interval. Further, the memory 130 may include an instruction set associated with editing video content including a slow motion interval. According to an embodiment, the memory 130 may store frames corresponding to a general video and a high-speed video obtained by the camera 180. Further, the memory 130 may store video content to which a slow motion interval is applied based on a high-speed video.

The display 160 may output at least one screen associated with operating the electronic device 100. According to an embodiment, the display 160 may output a screen for selecting the camera 180 to capture a general video or a high-speed video, a screen for outputting a preview image obtained according to activation of the camera 180, a screen for playing back a video to which a slow motion interval is applied, a screen for editing a video to which a slow motion interval is applied, or the like, in response to a user input. According to various embodiments, the display 160 may output a screen for editing a slow motion interval of a video captured at a high speed.

The camera 180 may be located at one side of the housing of the electronic device 100, may capture an image in response to control of the processor 120, and may transmit the captured image to the processor 120. According to an embodiment, the camera 180 may capture an image at a specified speed (e.g., a first number of frames per second, hereinafter, a description will be given relative to 240 frames per second) in response to control of the processor 120. Further, the camera 180 may transmit some of frames of an obtained image to the processor 120. For example, the camera 180 may transmit some of obtained 240 frames per second (hereinafter, a description will be given relative to 10 frames per second) as a preview image to the display 160 (or transmit some of the obtained 240 frames per second as the preview image to the display 160 based on control of the processor 120). According to various embodiments, the processor 120 may generate a preview image by sampling 240 frames per second transmitted from the camera 180 (e.g., sample one every 16 of 240 frames) and may transmit the preview image to the display 160. According to various embodiments, the camera 180 may capture a general video (e.g., a second number of frames per second, hereinafter, a description will be given with respect to 30 frames per second) in response to control of the processor 120. If an amount of image variation between frames is greater than or equal to a specified level, the camera 180 may capture a high-speed video (e.g., 240 frames per second).

As described above, the electronic device 100 according to an embodiment of the present disclosure may select at least one interval from a high-speed video captured at a high speed using the camera 180 and may generate video content in which the selected interval is converted into a slow motion. Alternatively, the electronic device 100 may select a plurality of intervals corresponding to a specified condition from a high-speed video and may generate video content in which each of the plurality of selected intervals is converted into a slow motion interval.

Figure 2:
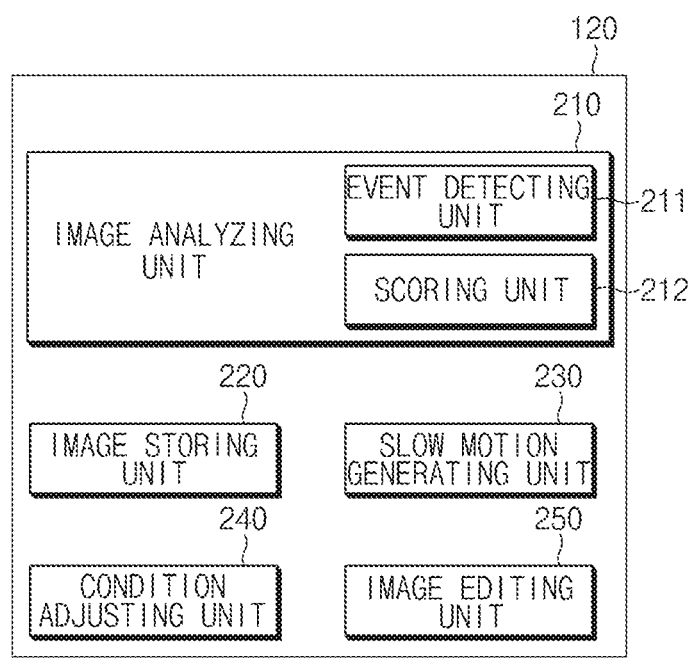
FIG. 2 is a block diagram illustrating an example of a processor according to an embodiment of the present disclosure.

FIG. 2 is a block diagram illustrating an example of a processor according to an embodiment of the present disclosure.

Referring to FIG. 2, a processor 120 according to an embodiment of the present disclosure may include an image analyzing unit 210, an image storing unit 220, a slow motion generating unit 230, a condition adjusting unit 240, and an image editing unit 250. For example, at least some of the elements of the processor 120 may be implemented with at least one of hardware or software. Alternatively, at least one processor may be used to implement each of the elements.

The image analyzing unit 210 may control a camera 180 of FIG. 1 to capture a general video or a high-speed video according to a setting or a user input. The image analyzing unit 210 may perform shake correction upon image capture. For example, the image analyzing unit 210 may extract image variation between a previous frame and a current frame and may perform shake correction if the extracted image variation is determined as a shake within a predefined level (e.g., image variation within a constant level according to hand holding). The image analyzing unit 210 may detect (or obtain information of) an actual amount of image variation between frames (e.g., subtract from an amount of variation in motion or movement by an amount of shakes). According to various embodiments, the image analyzing unit 210 may determine a shake based on information of a sensor (e.g., an acceleration sensor or a geomagnetic sensor) and may correct an amount of image variation according to an amount of shakes. The image analyzing unit 210 may analyze an image transmitted from the camera 180, and may perform interval selection and scoring based on the analyzed result. In this regard, the image analyzing unit 210 may include an event detecting unit 211 and a scoring unit 212.

The event detecting unit 211 may detect or obtain, for example, an amount of image variation between frames by performing image analysis for a preview image (e.g., 5 to 20 frames per second, for example, 10 frames) transmitted from the camera 180. For example, the event detecting unit 211 may detect an amount of image variation (or obtain information of an amount of image variation) between adjacent frames among 10 frames per second. According to various embodiments, the event detecting unit 211 may sample a constant number of frames (e.g., extract some of 10 frames) and may detect an amount of image variation using the sampled frames. For example, the event detecting unit 211 may obtain first frames per second and may detect an amount of image variation (or obtain information of an amount of image variation) between the obtained first frames. Alternatively, the event detecting unit 211 may sample one (e.g., a first frame or a last frame among 20 frames) of frames obtained per two seconds (e.g., 20 frames in case of 10 frames per second) and may detect an amount of image variation (or obtain information of an amount of image variation) between the sampled frames. According to various embodiments, the event detecting unit 211 may extract a specified number of frames (e.g., 10 frames per second) among frames per second (e.g., 240 frames per second) using the same extraction interval and may detect an amount of image variation (or obtain information of an amount of image variation) between the extracted frames. Alternatively, the event detecting unit 211 may perform various types of sampling (e.g., sampling at a regular interval or at an irregular interval) in connection with detecting an amount of image variation (or obtaining information of an amount of image variation). According to various embodiments, the event detecting unit 211 may extract frames at intervals of a specified millisecond (msec) in connection with measuring an amount of image variation. For example, the event detecting unit 211 may extract frames at intervals of 100 msec, 100 msec, or 200 msec and may measure an amount of image variation between the extracted frames.

The above-mentioned sampling interval may vary according to hardware performance of an electronic device 100 of FIG. 1 or a current use degree of the processor 120 of the electronic device 100. If an amount of image variation meets a specified condition, for example, if a degree to which an image is changed is greater than or equal to a specified reference value, the event detecting unit 211 may assign an event and may collect event information associated with the assigned event. The event information may be for indicating a point to which an event is assigned since image variation of a specified level or more occurs and may include order information, time information, or the like. Further, the assigned event information may include a level value of an amount of image variation. The event detecting unit 211 may accumulate and store the assigned event information until image capture is ended. The event detecting unit 211 may transmit the accumulated event information to the scoring unit 212.

According to various embodiments, the event detecting unit 211 may correct an amount of image variation based on sensor information. For example, the event detecting unit 211 may obtain motion or movement of the electronic device 100 and may correct an amount of image variation based on a direction or speed of the obtained motion or movement. According to an embodiment, if an image capture direction of the electronic device 100 moves along motion or movement of an object (e.g., if an angle of image capture is changed or if a location of image capture is changed), the motion or movement of the object included in an image may be detected to be relatively larger (e.g., if a movement direction of image capture differs from a movement direction of the object) or be relatively smaller (e.g., if a movement direction of image capture is the same as that of the object). In connection with compensating this situation, the event detecting unit 211 may calculate a motion or movement level of the electronic device 100 based on obtained sensor information and may apply the calculated motion or movement level to an amount of image variation between frames. The event detecting unit 211 may determine to assign an event, based on an amount of variation in motion or movement of a real object. The event detecting unit 211 may assign the event while an image is captured or after the image capture is ended.

In connection with assigning the event while the image is captured, for example, if there is a constant reference value or more with respect to a specified reference value (e.g., a previously stored reference value for an amount of image variation), the event detecting unit 211 may assign the event. In connection with assigning the event after the image capture is ended, the event detecting unit 211 may assign the event to an image having a relatively high amount of variation among all images. For example, the event detecting unit 211 may determine a level of an amount of variation in an image to assign an event, based on the ratio of the entire interval of a captured image an event assignment interval and may assign the event to frames indicating an amount of image variation which is greater than or equal to the determined amount of variation. After an image is captured, the event detecting unit 211 may assign an event relative to a specified reference value.

The scoring unit 212 may analyze collected event information to assign a score. In this operation, the scoring unit 212 may assign a score in an absolute score scheme according to a level of an amount of variation in each image (e.g. a score in which an amount of image variation corresponds to a level). Alternatively, the scoring unit 212 may assign a score in a relative score scheme according to a relative level of an amount of variation in each image (e.g., assign a higher score to event information in which an amount of image variation is relatively high and assign a lower score to event information in which an amount of image variation is relatively low). The scoring unit 212 may select an interval corresponding to a specified condition relative to an absolute score or a relative score. For example, the scoring unit 212 may select intervals in which event information where an absolute score of a specified level or more is collected and may calculate interval information (e.g., a start point and an end point of an event, an average value of assigned scores, a maximum value and a minimum value of the assigned scores, and the like for each of events with consecutive constant intervals). The scoring unit 212 may transmit the at least one of calculated interval information to the slow motion generating unit 230.

According to an embodiment, if the absolute score scheme is applied, the scoring unit 212 may obtain relatively many interval information (or interval information obtained after relatively many intervals are selected) for a video with a high amount of image variation. Alternatively, the scoring unit 212 may obtain interval information by a specified number by applying the relative score scheme to a video with a high amount of image variation. In this process, the scoring unit 212 may automatically adjust a level of an amount of image variation (e.g., increase a reference value of an amount of image variation) to obtain interval information by a specified number. If the absolute score scheme is applied, the scoring unit 212 may obtain relatively small interval information (e.g., interval information obtained after relatively small intervals are selected) for a video with a low amount of image variation. Alternatively, the scoring unit 212 may obtain interval information by a specified number by applying the relative score scheme to a video with a low amount of image variation. In this process, the scoring unit 212 may automatically adjust a level of an amount of image variation (e.g., decrease a reference value of an amount of image variation) to obtain interval information by a specified number.

The absolute score scheme or the relative score scheme may be changed according to an intention of an application designer or a user setting. A setting of a level of an amount of image variation associated with obtaining interval information in the absolute score scheme and the number of interval information obtained in the relative score scheme may be changed according to a user setting or an intention of the application designer. In this regard, the electronic device 100 may provide a screen for changing a score scheme, a screen for setting a level of an amount of image variation, a screen for setting the number of interval information, or the like. The scoring unit 212 may assign the score while an image is captured or after image capture is ended. The scoring unit 212 may perform scoring for an amount of image variation based on specified reference values while an image is captured. After image capture is ended, the scoring unit 212 may assign a relative score for an amount of image variation or may assign an absolute score based on a previously stored reference value.

The image storing unit 220 may store a general video or a high-speed video provided from the camera 180 in a memory 130 of FIG. 1. According to an embodiment, while the event detecting unit 211 detects an event based on a preview image, the image storing unit 220 may store a related high-speed video in the memory 130. The high-speed video stored in the memory 130 may be provided to the slow motion generating unit 230.

The slow motion generating unit 230 may determine a sampling rate of a slow motion interval based on a high-speed video stored in the image storing unit 220 and interval information provided from the scoring unit 212 and may generate a slow motion based on the determined sampling rate. The sampling rate may be determined according to, for example, a level of an amount of image variation. According to an embodiment, the slow motion generating unit 230 may determine a sampling rate of an interval based on score information, an average value of scores, a maximum/minimum value of the scores, and the like which are included in interval information. The slow motion generating unit 230 may apply longer playback extension (e.g., extension to a playback time of 8 seconds by equally dividing all of 240 frames per second at intervals of 30 frames per second) to an interval with a relatively high score (e.g., an interval with a relatively high amount of image variation). The slow motion generating unit 230 may apply shorter playback extension (e.g., extension to a playback time of 2 seconds at intervals of 30 frames per second by sampling 60 of 240 frames per second and extracting one frame per 4 frames) to an interval with a relatively low score (e.g., an interval with a relatively low amount of image variation).

The slow motion generating unit 230 may calculate some of 240 frames per second (e.g., extract 30 frames by sampling 1 frame per 8 frames) in an interval which is not selected and may collect frames to be played back for 1 second. As a result, video content including a slow motion interval may be played back at a frame rate of 30 frames per second. According to various embodiments, the slow motion generating unit 230 may extend an interval playback time to play back 240 frames per second as 20 frames per second according to a setting. Alternatively, the slow motion generating unit 230 may extend an interval playback time to play back 240 frames per second as 40 frames or 60 frames per second. The number of frames selected for extension may be determined by a frame rate per second in a general playback interval. For example, if the general playback interval is configured to be played back at a frame rate of 20 frames per second, the slow motion generating unit 230 may sample or divide frames per second in a high-speed video to be played back at intervals of 20 frames per second.

According to various embodiments, the slow motion generating unit 230 may apply a margin interval for a slow motion interval. For example, the slow motion generating unit 230 may adjust a playback extension size including a start constant range and an end constant range of a slow motion interval to differ from a playback extension size of a central portion (or after the start constant range before the end constant range). According to an embodiment, with respect to a slow motion interval for 10 seconds obtained by 240 frames per second (a total of 2400 frames), the slow motion generating unit 230 may determine playback extension, for start one second of the slow motion interval and end one second of the slow motion interval, as 4 seconds and may process playback extension of a central portion of the slow motion interval at intervals of 8 seconds. In this regard, the slow motion generating unit 230 may sample 120 of 240 frames located for the start one second of a slow motion interval (e.g., sample 120 frames by extracting 1 frame per 2 frames) and may process the sampled 120 frames to be played back at a rate of 30 frames per second. If the playback extension for the start one second of the slow motion interval and the end one second of the slow motion interval is determined as 2 seconds, the slow motion generating unit 230 may sample 60 frames per second and may process the sampled 60 frames to be played back at a frame rate of 30 frames per second. According to various embodiments, the slow motion generating unit 230 may process playback extension for a start constant time and an end constant time of the slow motion interval at a general playback speed (e.g., 30 frames per second). In this case, the slow motion generating unit 230 may extract 30 frames by sampling 240 frames per second at intervals of 8 frames and may process the extracted 30 frames to be played back at a frame rate of 30 frames per second.

According to an embodiment, the slow motion generating unit 230 may store and manage start frame information of a slow motion interval, end frame information of the slow motion interval, and slow motion information including a sampling rate (e.g., ½ time speed, ¼ time speed, ⅛ time speed, ¹⁄₁₆ time speed, or the like) for the slow motion interval. A video player may verify slow motion information upon playing back a video including a slow motion interval and may play back a slow motion according to a sampling rate in the slow motion interval.

The condition adjusting unit 240 may adjust a size of a slow motion interval and the number of slow motion intervals. In this regard, the condition adjusting unit 240 may display a screen for adjusting a level value of an amount of image variation, a screen for selecting the number of slow motion intervals, and the like on a display 160 of FIG. 1. The condition adjusting unit 240 may store an amount of image variation or the number of the slow motions selected according to a user input in the memory 130. The amount of image variation or the number of the slow motions stored in the memory 130 may be referred to by the event detecting unit 211. According to various embodiments, the condition adjusting unit 240 may adjust a size of an object applied to event detection, the number of objects applied to event detection, and the like according to a user input. The adjusted size of the object and the adjusted number of the objects may be used to detect and track the object.

The image editing unit 250 may edit video content to which a slow motion interval is applied, according to a specified scheme. For example, the image editing unit 250 may output an item associated with editing a slow motion on a screen where a gallery application is executed, a home screen, or the like. If a request associated with editing a slow motion occurs, the image editing unit 250 may output a slow motion edit screen on the display 160. The slow motion edit screen may include, for example, a video content playback region, a representative frame region, and a slow motion interval region. The slow motion interval region may include at least one slow motion interval generated by the slow motion generating unit 230. Thus, a plurality of slow motion interval regions may be located on a screen.

The image editing unit 250 may adjust a length of a slow motion interval in response to a user input (e.g., a touch input which occurs on a slow motion interval region). Alternatively, the image editing unit 250 may delete a slow motion interval in response to a user input. Alternatively, the image editing unit 250 may select a general interval except for a slow motion interval (e.g., an interval played back at a frame rate of 30 frames per second by sampling 240 frames per second in a high-speed video at intervals of 8 frames) as a slow motion interval in response to a user input and may transmit the selected slow motion interval to the slow motion generating unit 230, thus generating a slow motion (e.g., change or divide a sampling unit of 240 frames per second in a high-speed video corresponding to the general interval selected as the slow motion interval and extend a playback time). The image editing unit 250 may store video content including an edited slow motion interval in the memory 130 or may transmit the video content to a server or an external electronic device via a communication interface, in response to a user input.

According to various embodiments, the image analyzing unit 210 may adjust an image capture speed according to event detection. For example, the image analyzing unit 210 may instruct the camera 180 to capture a general video. If an amount of image variation of a specified level or more occurs, the image analyzing unit 210 may instruct the camera 180 to capture a high-speed video. According to an embodiment, if an object of a constant size or more is detected while a general video is captured and if motion or movement of the object occurs, the image analyzing unit 210 may instruct the camera 180 to capture a high-speed video. If motion or movement of an object is ended or if a size of the object is reduced to a constant size or less, the image analyzing unit 210 may instruct the camera 180 to stop capturing the high-speed video and capture a general video.

In the above-mentioned description, an embodiment is exemplified as the event detection and the scoring are performed while the image is captured. However, embodiments are not limited thereto. For example, the event detection and scoring operation may be performed, for example, after image capture is ended. According to an embodiment, the event detecting unit 211 may sample a high-speed video stored in the memory 130, according to a request to generate a slow motion. For example, the event detecting unit 211 may sample a few frames (e.g., 1 frame) per a few seconds (e.g., 1 second) from a high-speed video and may detect an amount of image variation between the sampled frames, thus collecting event information. After image capture is ended, the scoring unit 212 may collect at least one interval information based on event information transmitted from the event detecting unit 211.

Figure 3:
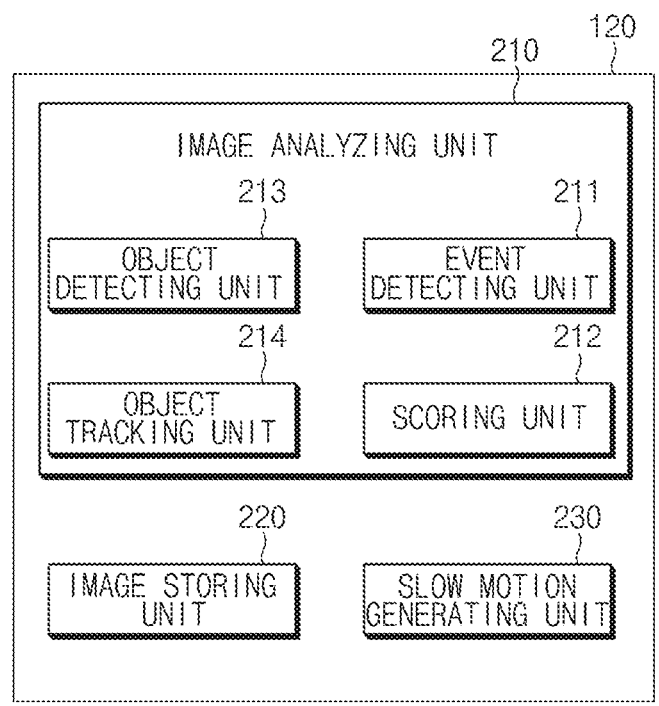
FIG. 3 is a block diagram illustrating another example of a processor according to an embodiment of the present disclosure.

FIG. 3 is a block diagram illustrating another example of a processor according to an embodiment of the present disclosure.

Referring to FIG. 3, a processor 120 according to an embodiment of the present disclosure may include an image analyzing unit 210, an image storing unit 220, and a slow motion generating unit 230. The image storing unit 220 and the slow motion generating unit 230 may be substantially the same or similar to an image storing unit and a slow motion generating unit described with reference to FIG. 2.

The image analyzing unit 210 may include an event detecting unit 211, a scoring unit 212, and an object detecting unit 213, and an object tracking unit 214.

The object detecting unit 213 may receive a preview image received from a camera 180 of FIG. 1 (or an image sampled from a high-speed video) and may detect an object based on the received preview image. According to an embodiment, the object detecting unit 213 may filter the received preview image to extract at least one object (e.g., a background object or a specific object except for a background). According to various embodiments, the object detecting unit 213 may output a screen for selecting at least one object on a display 160 of FIG. 1. The object detecting unit 213 may receive a user input (e.g., a touch input for selecting at least one object displayed on the display 160) and may extract an object in response to the received user input. In this operation, the object detecting unit 213 may extract a plurality of objects according to the user input. Alternatively, the object detecting unit 213 may provide object candidates and may extract only objects selected by a user. Alternatively, the object detecting unit 213 may automatically detect objects of a specified size or more.

The object tracking unit 214 may track the object extracted by the object detecting unit 213. For example, the object tracking unit 214 may store location information of the extracted object and may track motion or movement of the object on a next frame. In this operation, the object tracking unit 214 may calculate a motion vector including a scale change, a direction change, or the like of an object in the next frame and may determine a motion or movement degree of the object. If a motion or movement degree of an object which is being tracked is greater than or equal to a constant level, the object tracking unit 214 may provide information about the object (e.g., location information of the object and an amount of variation in motion or movement of the object) to the event detecting unit 211. According to various embodiments, if the object detecting unit 213 detects a plurality of objects, the object tracking unit 214 may track the plurality of objects. In this regard, the object tracking unit 214 may track a specified number of objects or more or objects of a specified size or more. According to an embodiment, in an environment configured to track the specified number of objects or more, if a selected object disappears from a frame, the object tracking unit 214 may detect another object which is not selected and may track the detected new object.

The event detecting unit 211 may receive object information of an object having an amount of motion or movement variation of a constant level or more from the object tracking unit 214. The event detecting unit 211 may assign an event based on the received object information and may generate event information (e.g., time information, location information, level information of an amount of motion or movement variation, or the like) corresponding to the event.

As described above, the scoring unit 212 may perform scoring based on the event information.

According to various embodiments, an electronic device may include a memory configured to store a high-speed video captured with a first number of frames per second and a processor configured to be electrically connected with the memory. The processor may be configured to detect an amount of image variation based on at least one (e.g., an image of 10 frames per second) of the first number of frames (e.g., an image captured with 240 frames per second) and generate a slow motion interval, a playback time of which is extended by dividing or sampling the first number of frames into a second number of frames (e.g., 30 frames per second) which are less than the first number of frames with respect to a video interval having an amount of image variation which meets a specified condition.

According to various embodiments, an electronic device is provided. The electronic device may include a memory configured to store a high-speed video captured with a first number of frames per second and a processor configured to be electrically connected with the memory, wherein the processor is configured to detect an amount of image variation based on at least one of the first number of frames and generate a slow motion interval, a playback time of which is extended, by dividing the first number of frames into a second number of frames which are less than the first number of frames or sampling at least some frames of the first number of frames, with respect to a video interval including at least one frame having an amount of image variation which meets a condition.

According to an embodiment, the electronic device may further include a camera configured to capture a high-speed video with the first number of frames, wherein the processor is configured to while the camera captures the high-speed video, assign an event at a time when the captured video (or captured frames) has an amount of image variation of a level or more, if the high-speed video capturing operation of the camera is ended, assign a score corresponding to an amount of image variation between accumulated events, calculate an interval where the assigned score meets a condition and generate the slow motion interval where the calculated interval is extended to a playback time.

According to an embodiment, the electronic device may further include a camera configured to capture a high-speed video with the first number of frames, and wherein the processor is configured to, if the capturing operation of the camera is ended, perform a comparison between frames of the high-speed video captured and stored by the camera and assign an event to frames having an amount of image variation of a level or more and assign a score according to a level of an amount of image variation between the assigned events and generate the slow motion interval based on an interval where the assigned score meets a condition.

According to an embodiment, the processor may be configured to detect the amount of image variation based on a preview image configured with some frames of the first number of frames.

According to an embodiment, the processor may be configured to detect an amount of object variation of a level or more by detecting an object based on a preview image configured with some frames of the first number of frames and tracking the detected object.

According to an embodiment, the processor may be configured to detect and display a candidate object based on a preview image configured with some frames of the first number of frames and detect an object selected by a user input among the candidate objects and generate the slow motion based on frames at times when the detected object has an amount of object variation of a level or more.

According to an embodiment, the processor may be configured to detect a plurality of objects in response to a user input from a preview image configured with some frames of the first number of frames and classify and store frames at times when each of the plurality of detected objects has an amount of object variation of a level or more.

According to an embodiment, the processor may be configured to generate a number of slow motion intervals according to a user input or a setting.

According to an embodiment, the processor may be configured to adjust a level of the amount of image variation according to a user input or a setting and generate the slow motion interval based on events having an amount of image variation of the adjusted level or more.

According to an embodiment, the processor may be configured to adjust a sampling rate of the slow motion interval in a different way according to a level of the amount of image variation.

According to an embodiment, the processor may be configured to detect objects of a size or more and generate the slow motion interval based on an amount of variation between the plurality of detected objects of the size or more.

According to an embodiment, the processor may be configured to detect occurrence of a shake of the high-speed video and apply image correction according to the shake.

According to an embodiment, the processor may be configured to detect motion or movement of the electronic device and detect the amount of image variation according to a direction and speed of the motion or movement.

According to an embodiment, the electronic device may further include a display configured to display video content including the slow motion interval, wherein the processor is configured to display a playback bar indicating a playback location of the video content and output a guide object indicating the slow motion interval on the playback bar.

According to an embodiment, the processor may be configured to adjust a range of frames regions included in the guide object or the number of the frame regions, in response to a user input.

According to an embodiment, the processor is configured to generate a new slow motion interval in response to a change of the guide object.

According to various embodiments, an electronic device is provided. The electronic device may include a memory configured to store a high-speed video captured with a first number of frames per second and a processor configured to be electrically connected with the memory, wherein the processor is configured to detect an amount of image variation based on at least one of the first number of frames, detect a plurality of intervals where an amount of image variation of a level or more is continuous by a length and generate a plurality of slow motion intervals, a playback time of which is extended, by dividing the first number of frames into a second number of frames which are less than the first number of frames or sampling at least some frames of the first number of frames, with respect to the plurality of detected intervals.

Figure 4:
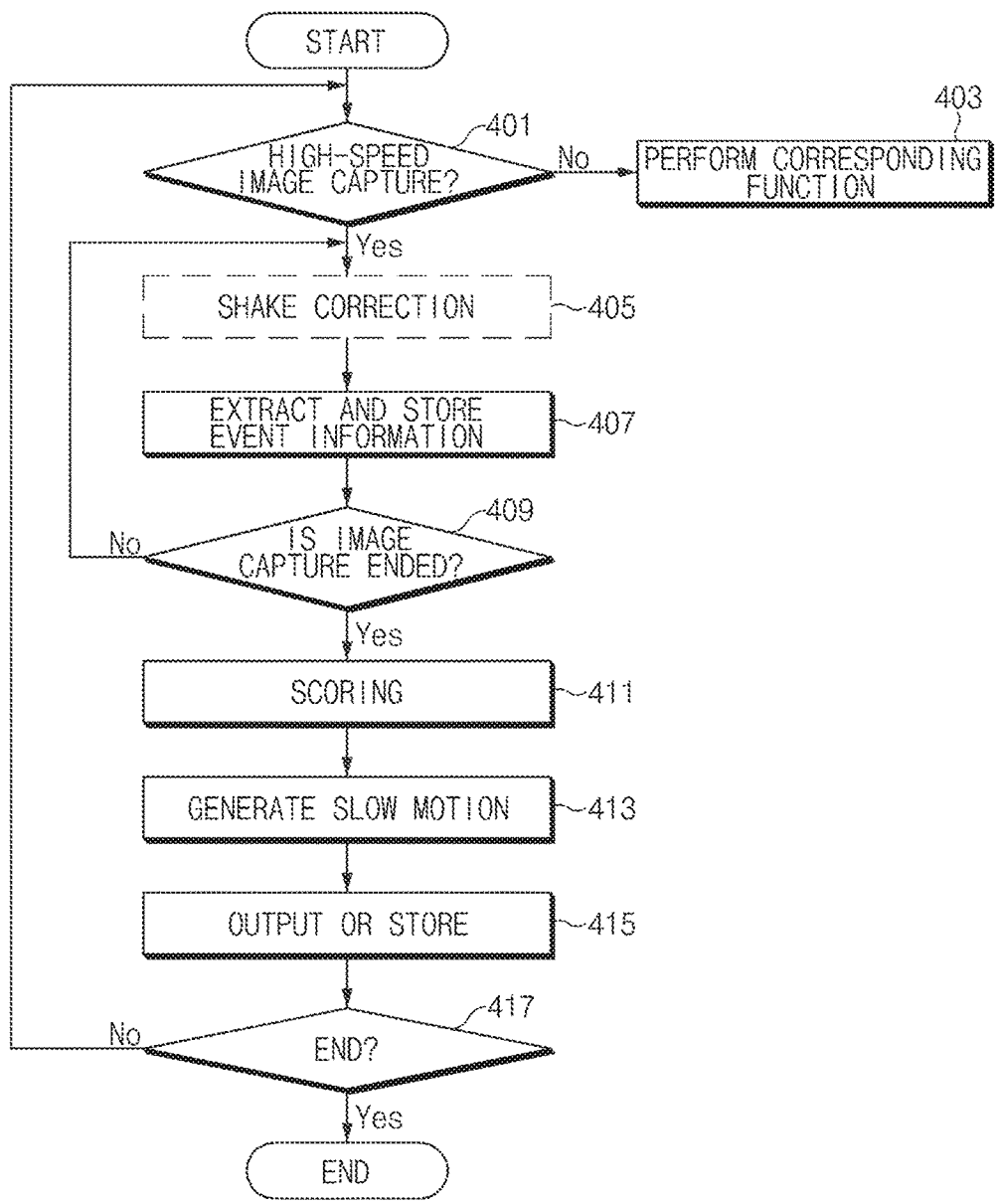
FIG. 4 is a flowchart illustrating an example of a method for providing video content according to an embodiment of the present disclosure.

FIG. 4 is a flowchart illustrating an example of a method for providing video content according to an embodiment of the present disclosure.

Referring to FIG. 4, in connection with the method for providing the video content according to an embodiment of the present disclosure, in operation 401, a processor 120 (e.g., an image analyzing unit 210) of FIG. 2 or 3 may determine whether a request for high-speed image capture occurs. In this regard, the processor 120 may output a screen including an icon or menu associated with the high-speed image capture. Alternatively, the processor 120 may automatically enter a high-speed image capture state when a camera 180 of FIG. 1 is activated. According to various embodiments, the request for the high-speed image capture may include occurrence of an input signal for selecting a video captured at a high speed, stored in a memory 130 of FIG. 1. If there is no high-speed image capture request, in operation 403, the processor 120 may perform a specified function. For example, the processor 120 may capture a general video or a high-speed video in response to a user input.

If the request for the high-speed image capture occurs, the processor 120 (e.g., the image analyzing unit 210) may activate the camera 180 to obtain a video with frames of a specified frame rate (e.g., 240 frames per second). In operation 405, the processor 120 (e.g., the image analyzing unit 210) may perform shake correction. The processor 120 may omit a shake correction operation if there is no shake of an electronic device 100 of FIG. 1 or according to a setting. In the operation of performing the shake correction, the processor 120 may determine occurrence of a shake using a comparison value between a previous frame and a current frame based on a reference amount of variation configured to be determined as the shake. Alternatively, the processor 120 may determine occurrence of a shake based on sensor information.

In operation 407, the processor 120 (e.g., an object detecting unit 213, an object tracking unit 214, and an event detecting unit 211 of FIG. 3) may extract and store event information. In this regard, the processor 120 may detect variation between frames. If the variation between the frames is greater than or equal to a specified level, the processor 120 may determine that an event occurs and may determine that the same event occurs during the occurrence of the variation between the frames which is greater than or equal to the specified level. The processor 120 may assign an event to a frame in which an amount of image variation of a specified level or more between frames occurs, based on detecting an amount of image variation between frames and may calculate event information based on the assigned event. The event information may include a time when the event occurs, a level of an amount of image variation of the event. According to various embodiments, operation 407 may be performed after operation 409 to be described below. For example, upon capturing a high-speed video, the processor 120 may extract and store frames having an amount of image variation of a specified level or more. After image capture is ended, the processor 120 may assign an event to the stored frames.

In operation 409, the processor 120 (e.g., the image analyzing unit 210) may determine whether a request associated with ending image capture occurs. If there is no request associated with ending the image capture, the processor 120 may branch to operation 401 to perform the operation again from operation 401. If the request associated with ending the image capture occurs, in operation 411, the processor 120 (e.g., a scoring unit 212 of FIG. 2 or 3) may perform scoring to calculate interval information. For example, the processor 120 may a score of a specified level according to an amount of image variation between frames corresponding to each event. Alternatively, the processor 120 may assign a relative score according to an amount of image variation between all frames of video content. According to an embodiment, the processor 120 may assign a score of an object which is relatively large in size in a frame to be higher than a score of an object which is relatively small in size by a specified level (or be lower according to a setting).

In operation 413, the processor 120 (e.g., a slow motion generating unit 230 of FIG. 2 or 3) may generate a slow motion based on the assigned scores. For example, as described above, the processor 120 may assign a high sampling rate to information about an interval with a high score (e.g., a high absolute score or a high relative score) and may assign a relative low sampling rate to information about an interval with a low score (e.g., a low absolute score or a low relative score). The processor 120 may determine a playback extension time for the interval information based on the assigned sampling rate. The processor 120 may sample and divide frames included in the interval information based on the determined playback extension time.

According to various embodiments, the processor 120 may capture a video at a constant speed (e.g., 240 frames per second). The processor 120 may determine a sampling rate for a general interval and a slow motion interval upon playing back a high-speed video and may perform playback according to the determined sampling rate. For example, the processor 120 may play back the general interval (e.g., an interval where there is no event or an interval which is not set to the slow motion interval) at one time speed (e.g., sample and play back 30 of 240 frames when playback of 30 frames per second is set). The processor 120 may play back the slow motion interval (e.g., an interval where consequent events having an amount of image variation of a specified level or more are located) at specified times speed (e.g., sample 60 of 240 frames and play back the 60 frames at intervals of 30 frames per second for 2 seconds when ½ time speed is set, sample 120 of 240 frames and play back the 120 frames at intervals of 30 frames per second for 4 seconds when ¼ time speed is set, and play back 240 frames at intervals of 30 frames per second when ⅛ time speed is set).

According to various embodiments, for example, the processor 120 may play back and extend an image of 10 seconds (e.g., 240 frames per second) to an image of 80 seconds (e.g., 30 frames per second) according to the determined sampling rate to generate a slow motion interval. Alternatively, the processor 120 may play back and extend an image of 10 seconds (e.g., 240 frames per second) to an image of 40 seconds according to the determined sampling rate (e.g., extract 120 frames by sampling 240 frames per second, extract one frame per 2 frames, and play back and extend 120 frames per second to an image of 4 seconds). According to various embodiments, the processor 120 may play back and extend an image of 6 seconds in a central portion (or an image of 8 seconds or 7 seconds) without playing back and extending an image of 2 seconds (or an image of 1 second or 1.5 seconds) in a first half in an image of 10 seconds and an image of 2 seconds (or an image of 1 second or 1.5 seconds) in a second half. The processor 120 may optimize recognition of a slow motion by providing a sufficient recognition time to a start portion where a change occurs in an image and a portion where the change is ended and verifying a more accurate image through the slow motion. For example, a user may enhance concentration on a slow motion portion by slowly and accurately understanding a situation through a slow motion in a situation where a quick change of an object (a virtual object displayed on a display 160 of FIG. 1) to some degree is recognized (e.g., view a first half where a change occurs) and recognizing a state where an object is quickly changed again (e.g., recognize a second half). According to various embodiments, the processor 120 may provide a normal change to only a constant portion in the first half (e.g., an image of 2 seconds in the first half in an image of 10 seconds) and may omit a change in the second half.

In operation 415, the processor 120 may output video content including the slow motion on a display 160 of FIG. 1 or may store the video content in a memory 130 of FIG. 1. For example, after the generation of the slow motion is completed, the processor 120 may automatically play back the video content. Alternatively, the processor 120 may notify a user that the generation of the slow motion is completed (e.g., output guide information via the display 160 or an audio device) and may play back the video content including the slow motion according to a user input.

In operation 417, the processor 120 may determine whether a request to end operation of a function of an electronic device 100 of FIG. 1 occurs. If there is no request to end the operation of the function, the processor 120 may branch to operation 401 to perform the operation again from operation 401.

According to various embodiments, the electronic device 100 may include a dual camera. The dual camera may include at least two cameras which face the same direction. The electronic device 100 may capture an image using the at least two cameras and may store and display the captured image. The dual camera may include, for example, a wide-angle camera (with a relatively wide view angle) and a telephoto camera (with a relatively narrow view angle). Alternatively, the dual camera may include a color camera and a black and white camera.

In connection with an image captured using the dual camera, the processor 120 of the electronic device 100 may convert a wide-angle image into a telephoto image in a highlight interval (e.g., an interval where an amount of image variation is greater than or equal to a constant level) while the wide-angle image is played back. When the same subject is captured using a first camera (e.g., a wide-angle camera) and a second camera (e.g., a telephoto camera), the processor 120 of the electronic device 100 may capture an image at a first speed (e.g., 30 frames per second) using the first camera and may capture the image at a high speed (e.g., 240 frames per second) using the second camera. The processor 120 may detect an amount of image variation using at least some of frames of an image captured by the first camera and may detect an event according to the detected amount of image variation.

If the image capture is completed, in operation 411, the processor 120 may perform scoring using events in which an image is analyzed by the first camera. In operation 413, the processor 120 may generate a slow motion using the image of the second camera in a specific interval (e.g., an interval having an amount of image variation of a specified level or more). The processor 120 may output a first image captured by the first camera and a second image captured by the second camera on the display 160 or may store the first image and the second image in the memory 130. According to various embodiments, the processor 120 may perform high-speed image capture using the first camera (e.g., a telephoto camera) and may perform low-speed image capture using the second camera (e.g., a wide-angle camera). The processor 120 may automatically generate at least one slow motion interval associated with an interval having an amount of image variation of a specified level, with respect to an image captured at a high speed.

Figure 5:
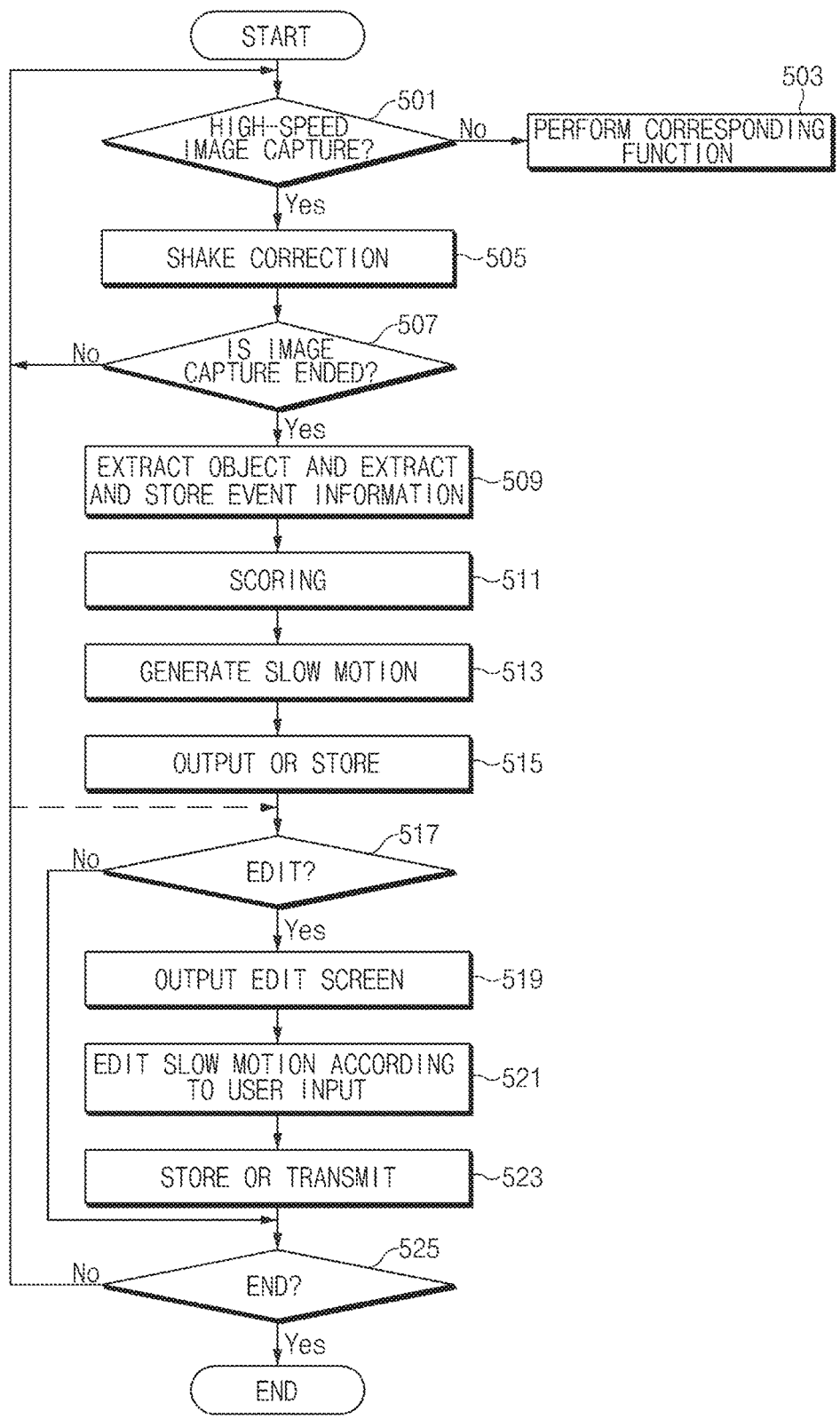
FIG. 5 is a flowchart illustrating another example of a method for providing video content according to an embodiment of the present disclosure.

FIG. 5 is a flowchart illustrating another example of a method for providing video content according to an embodiment of the present disclosure.

Referring to FIG. 5, in connection with providing the video content, in operation 501, a processor 120 (e.g., an image analyzing unit 210) of FIG. 2 or 3 may determine whether a request for high-speed image capture occurs. If there is no request for the high-speed image capture, in operation 503, the processor 120 may perform a specified function. The request for the high-speed image capture may include, for example, occurrence of an input signal for instructing high-speed image capture using a camera 180 of FIG. 1, occurrence of an input signal for selecting a video captured at a high speed, or the like. If the request for the high-speed image capture occurs, in operation 505, the processor 120 may selectively perform shake correction. If motion or movement of less than a specified level occurs, the processor 120 may perform a next operation without performing shake correction. If the motion or movement of the specified level associated with shake correction occurs (e.g., if sensor information corresponding to a shake is collected or if a shake pattern between obtained frames is detected), the processor 120 may perform motion or movement compensation of a frame in response to the occurrence of the motion or movement.

In operation 507, the processor 120 (e.g., the image analyzing unit 210) may determine whether a request to end image capture occurs. If there is no request to end the image capture, the processor 120 may branch to operation 501. If the request to end the image capture occurs, in operation 509, the processor 120 may extract an object and may extract and store event information.

In connection with extracting the object, the processor 120 (e.g., an object detecting unit 213 of FIG. 3) may filter at least some of frames of video content, image capture of which is ended, and may detect an object based on feature points drawn by the filtering (e.g., the object based on boundary line information). Alternatively, the processor 120 may detect candidate objects by filtering a frame and may output a selection screen for selecting at least one of the candidate objects. The processor 120 may detect an object in response to occurrence of an input signal for selecting at least one candidate object. In this operation, the processor 120 may sample a high-speed video stored in a memory 130 of FIG. 1 (e.g., extract 1 to 20 frames per second, for example, extract 1 frame or 2 frames per second, extract 10 frames per second, or the like) and may perform comparison between the sampled frames (e.g., image comparison between a frame sampled at a previous time t (a time associated with a captured image) and a frame sampled at a subsequent time t+1). According to various embodiments, the processor 120 may adjust a sample period according to a setting or a user input. According to various embodiments, the processor 120 may obtain frames at intervals of a specified time (e.g., 10 msec, 20 msec, 50 msec, 100 msec, or the like) and may measure an amount of image variation based on the obtained frames.

According to various embodiments, the processor 120 may limit the number of detected objects or may limit the number of candidate objects selectable by a user, according to a specified condition. For example, the processor 120 may detect only an object of a constant size or more or may provide a candidate object. If a specified number of objects or more are detected according to a specified condition, the processor 120 may select a constant number of objects according to a size or location of each of the objects. For example, the processor 120 may extract relative large objects in response to a constant number or may first detect objects relatively located in a central portion.

In connection with extracting and storing the event information, the processor 120 (e.g., an object tracking unit 214 and an event detecting unit 211 of FIG. 3) may detect an amount of variation in motion or movement of the object while tracking the detected object. If the amount of variation in motion or movement of the object is greater than or equal to a specified level, the processor 120 may assign an event and may collect and store event information corresponding to the assigned event (e.g., event order or time information, object information to which the event is assigned, a level value of an amount of variation, or the like). Alternatively, the processor 120 may assign an event based on an amount of variation between obtained image frames (e.g., an amount of variation in a vector of at least one feature point included in a frame) and may collect and store event information corresponding to the assigned event.

In operation 511, the processor 120 (e.g., a scoring unit 212 of FIG. 2 or 3) may perform scoring based on the extracted event information. The processor 120 may calculate at least one interval information to generate a slow motion based on a scoring process. The interval information may include, for example, information about a start time when an event which has consecutive constant intervals according to occurrence of motion or movement of a specific object occurs, information about an end time when the event is ended according to end of the motion or movement, an assigned score value (e.g., an average value and a maximum/minimum value), and the like. If there are a plurality of interval information, the processor 120 may select a specified number of interval information. Alternatively, the processor 120 may select interval information having a score of a constant level or more among the plurality of interval information.

In operation 513, the processor 120 (e.g., a slow motion generating unit 230 of FIG. 2 or 3) may generate a slow motion. The processor 120 may generate the slow motion by dividing video content obtained with 240 frames per second at intervals of specified frames per second (e.g., at intervals of 30 frames per second) based on interval information and extending a playback time. Alternatively, the processor 120 may store slow motion information configured to play back video content obtained with 204 frames per second at specified times speed and may play back a slow motion interval based on the configured slow motion information when playing back a video.

In operation 515, the processor 120 may output or store video content including the generated slow motion. When playing back a video including a slow motion interval, the processor 120 may play back an interval, where an event is not detected, at normal time speed or general time speed (e.g., one time speed) or at high times speed which is higher than the one time speed. The processor 120 may generate a slow motion by dividing frames (e.g., 240 frames per second) of an interval at intervals of specified frames (e.g., 30 frames) with respect to the interval where the event is detected (e.g., a slow motion interval) and playing back the divided frames.

In operation 517, the processor 120 (e.g., an image editing unit 250 of FIG. 2) may determine whether an edit request occurs. If the edit request does not occur, the processor 120 may skip subsequent operations (e.g., operations 519, 521, and 523) and may branch to operation 525. If the edit request occurs, in operation 519, the processor 120 may output an edit screen on the display 160. In this regard, the processor 120 may output an icon or menu associated with editing a slow motion on a screen where video content is output. Alternatively, after a slow motion is generated, the processor 120 may automatically output a slow motion edit screen. The processor 120 may verify a slow motion interval in connection with editing a slow motion and may output an edit screen for adjusting or deleting a range of an interval to which the slow motion will be applied.

In operation 521, the processor 120 (e.g., the image editing unit 250) may edit a slow motion according to a user input. For example, if a user touch input on a slow motion interval occurs, the processor 120 may process the slow motion interval to be more narrowed or widened than a previous interval. Together with adjusting the interval, the processor 120 may additionally extend a slow motion based on a high-speed video for the adjusted interval or may delete a previously generated slow motion interval. In operation 523, the processor 120 may store or transmit the edited video content according to a user input. Alternatively, the processor 120 may output the edited video content on the display 160 according to a user input.

In operation 525, the processor 120 may determine whether a request to end operation of a function of an electronic device 100 of FIG. 1 occurs. If the request to end the operation of the function does not occur, the processor 120 may branch to operation 501 or 517 to perform the operation again from operation 501 or 517.

Figure 6:
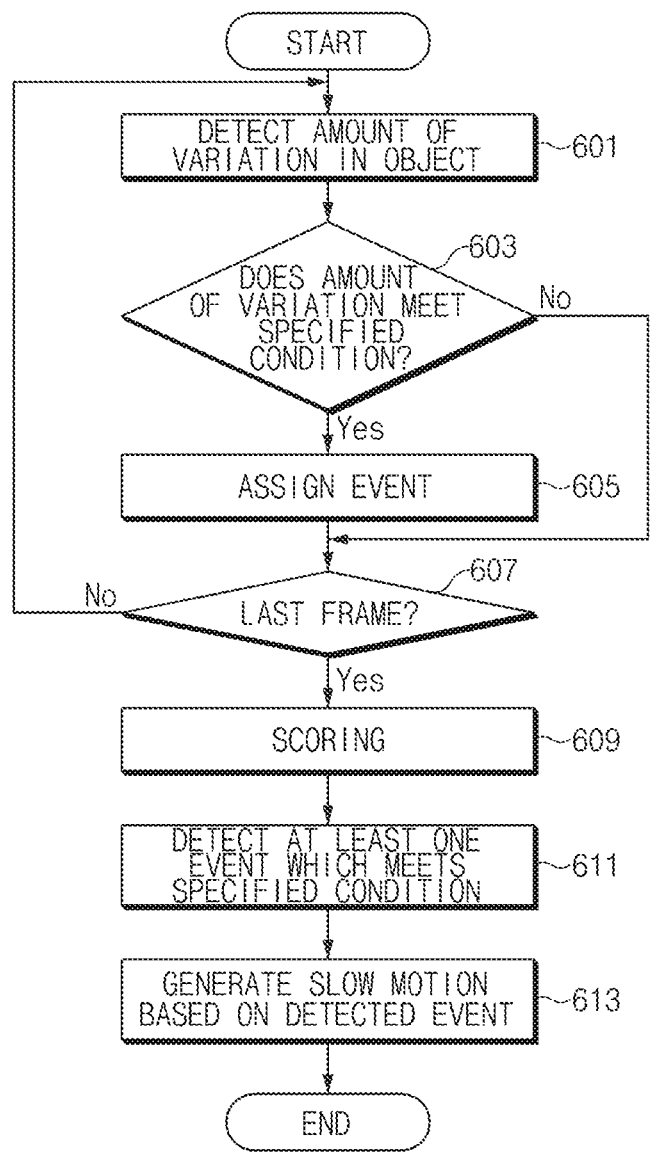
FIG. 6 is a flowchart illustrating an example of a method for providing video content associated with detecting event information according to an embodiment of the present disclosure.

FIG. 6 is a flowchart illustrating an example of a method for providing video content associated with detecting event information according to an embodiment of the present disclosure.

Referring to FIG. 6, in connection with the method for providing the video content, while a high-speed video is captured or in connection with the captured high-speed video (or captured high-speed video frames), in operation 601, a processor 120 (e.g., an object detecting unit 213 or an object tracking unit 214) of FIG. 3 may detect an amount of variation in an object. In this regard, the processor 120 may detect a candidate object (e.g., an object of a constant size or more) based on a preview image or an image sampled from a high-speed video. The processor 120 may provide a screen for selecting the detected candidate objects. A user may select at least one object on a screen while viewing the preview image or the image sampled from the high-speed video. The processor 120 may track an object specified by a user selection. If a plurality of objects are selected, the processor 120 may track each of the objects.

In operation 603, the processor 120 (e.g., the object tracking unit 214 or an event detecting unit 211 of FIG. 3) may determine whether the detected amount of variation meets a specified condition. For example, the processor 120 may determine whether an amount of variation of a specified level or more occurs. If the amount of variation meets the specified condition, in operation 605, the processor 120 (e.g., the event detecting unit 211) may assign an event. In this operation, the processor 120 may calculate event information (e.g., information about a time when the event occurs and information about an amount of variation in an object).

In operation 607, the processor 120 (e.g., an image analyzing unit 210 of FIG. 3) may determine whether a currently verified frame is the last frame. If the currently verified frame is not the last frame, the processor 120 may branch to operation 601 to perform the operation again from operation 601. If the currently verified frame is the last frame, in operation 609, the processor 120 (e.g., a scoring unit 212 of FIG. 3) may perform scoring for the assigned events. If a previous state is during image capture, the processor 120 may determine whether the image capture is ended and may determine whether a currently verified frame is the last frame of a video according to the end of the image capture. The processor 120 may assign a relatively high score to an event with a high amount of variation or may assign a score matched to a level of an amount of variation. In connection with assigning the matched score, an electronic device 100 of FIG. 1 may store and manage a score assignment table which defines scores to be assigned for a level of an amount of variation. Score values of the score assignment table may vary according to a user input or a setting.

In operation 611, the processor 120 (e.g., the scoring unit 212) may detect at least one event which meets a specified condition, based on the assigned score. For example, the processor 120 may detect events in which an amount of variation of a specified level or more is continuous and may detect interval information based on the detected events (e.g., start information of an event with consecutive constant intervals, end information of the event, and a score value).

In operation 613, the processor 120 (e.g., a slow motion generating unit 230 of FIG. 3) may generate a slow motion based on the detected event. The processor 120 may assign a relatively high sampling rate to events in which a score value is relatively high. The processor 120 may assign a relatively low sampling rate to events in which a score value is relatively low or may assign a sampling rate corresponding to a general video playback speed (e.g., a sampling rate supported by a video player of the electronic device 100). Alternatively, if an absolute score value is assigned, the processor 120 may assign a sampling rate assigned to the score. The electronic device 100 may store and manage a mapping table in which an absolute score value and a sampling rate are mapped with each other. The absolute score value to the sampling rate, stored in the mapping table, may be changed according to a user input or a setting.

According to various embodiments, the electronic device 100 may include a dual camera. In an environment including the electronic device 100 including the dual camera, the processor 120 may detect an amount of image variation using at least some (e.g., 1 to 20 frames or 10 frames) of frames obtained while performing image capture at a general speed (e.g., 30 frames per second) using a first camera. If an event having an amount of variation of a specified level or more occurs based on the detected amount of image variation, the processor 120 may activate a second camera to capture a high-speed video. If the occurrence of the event having the amount of variation of the specified level or more is released while the high-speed video is captured, the processor 120 may stop capturing the high-speed video based on the second camera. While the high-speed video is captured, the processor 120 may determine whether the event having the amount of image variation of the specified level or more is stopped or maintained using at least some of frames obtained by the second camera. Alternatively, the processor 120 may simultaneously operate the first camera and the second camera and may detect an event based on at least some of frames obtained by the first camera while the second camera captures a high-speed video. If the image capture is ended, the processor 120 may perform scoring for obtained events and may select a slow motion interval for events in which an amount of image variation of a specified level or more is continuous. If the slow motion interval is selected, the processor 120 may generate a slow motion interval image based on an image obtained based on the second camera.

According to various embodiments, a method for providing video content is provided. The method for providing video content may include detecting an amount of image variation using some of a first number of frames per second from a high-speed video captured with the first number of frames per second, detecting an interval having an amount of image variation which meets a condition and generating a slow motion interval, a playback time of which is extended, by dividing the first number of frames into a second number of frames which are less than the first number of frames or sampling at least some frames of the first number of frames, with respect to the interval.

According to an embodiment, the detecting of the amount of image variation may include detecting an object included in the frames, tracking the detected object and determining whether an amount of variation of a level or more occurs based on the tracking of the object.

According to an embodiment, the detecting of the interval may include assigning a score according to a level of the amount of image variation and detecting an interval having a score which meets a condition.

Figure 7:
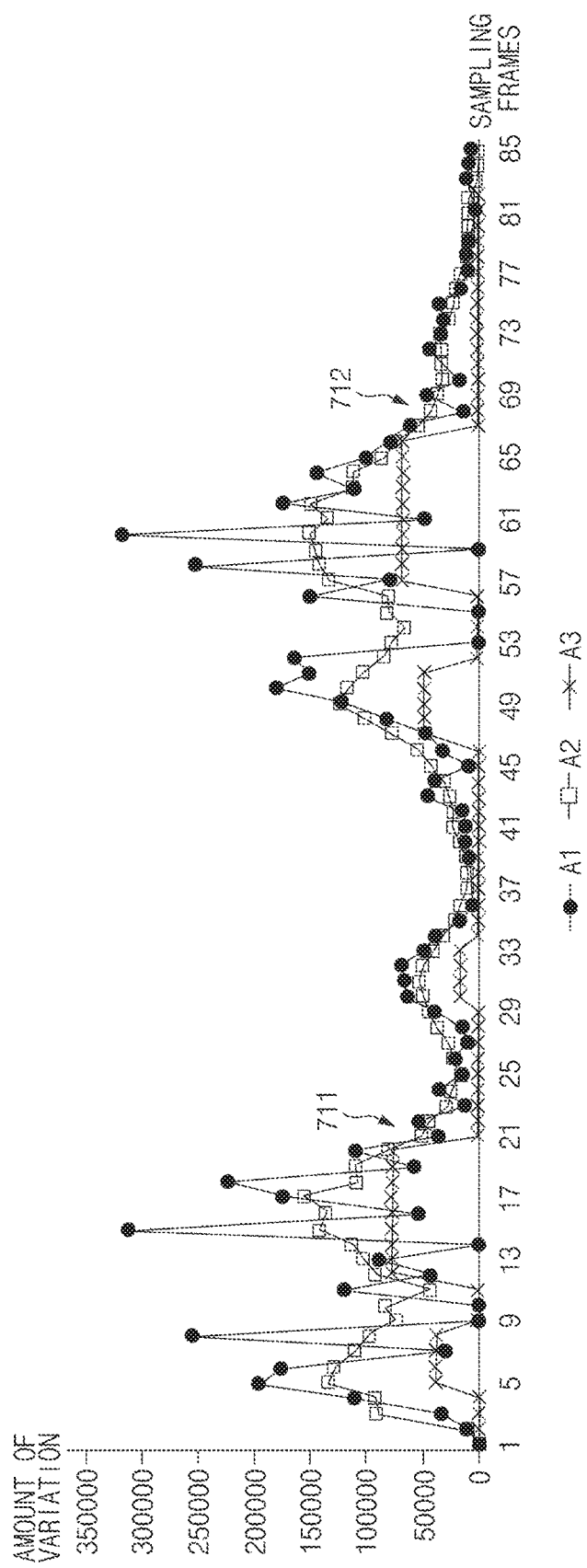
FIG. 7 is a drawing illustrating video scoring according to an embodiment of the present disclosure.

FIG. 7 is a drawing illustrating video scoring according to an embodiment of the present disclosure.

A processor 120 of FIG. 1 may process data according to an amount of image variation with respect to a video stored in a memory 130 of FIG. 1 or a video which is being captured. According to various embodiments, the processor 120 may produce first data A1 based on an amount of image variation between a previous frame and a current frame or between a plurality of specified frames. The processor 120 may product second data A2 by processing the first data A1 according to a specified scheme (e.g., average data between the produced first data A1). The processor 120 may calculate at least one third data interval A3 indicating an event based on at least one of the first data A1 and the second data A2 or by applying a specified algorithm or a specified calculation scheme to the first data A1 and the second data A2.

Referring to the shown drawing, the processor 120 may produce the first data A1 indicating an amount of variation between a previous frame and an input frame with respect to the input frame. The processor 120 may produce the second data A2 in which interval average values are calculated for the first data A1. If producing the second data A2, the processor 120 may extract events used to calculate slow motion candidate intervals (e.g., the third data intervals A3) based on the first data A1 and the second data A2. In this regard, the processor 120 may produce the third data intervals A3 indicating the events.

According to an embodiment, the processor 120 may calculate the third data intervals A3 using high values of the second data A2 among the first data A1. The processor 120 may determine data intervals, which meet a specified condition, among the third data intervals A3 as slow motion intervals. For example, the processor 120 may select two third data intervals, included in specified top some percentages (e.g., the top 20%), among five third data intervals A3 as slow motion intervals 711 and 712. Alternatively, the processor 120 may select a specified number of third data intervals (e.g., two third data intervals) among five third data intervals A3 as the slow motion intervals 711 and 712. The selected slow motion intervals 711 and 712 may be changed according to a user setting. For example, if the processor 120 is configured to select three slow motion intervals according to a user input, it may select three slow motion intervals among five three data intervals A3.

Figure 8A:
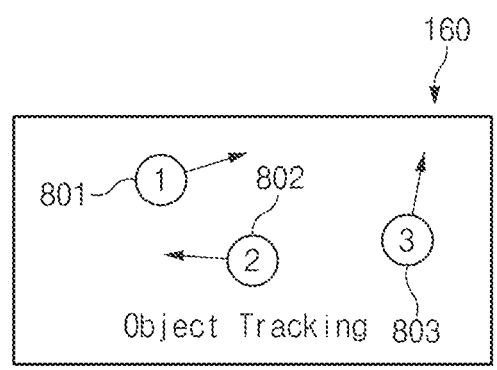
FIG. 8A is a drawing illustrating tracking of an amount of variation among a plurality of objects according to an embodiment of the present disclosure.

FIG. 8A is a drawing illustrating tracking of an amount of variation among a plurality of objects according to an embodiment of the present disclosure.

Referring to FIG. 8A, a camera 180 of an electronic device 100 of FIG. 1 may capture a subject including a plurality of objects 801 to 803 at a high speed and may transmit a video captured at the high speed to a processor 120 of FIG. 1. A display 160 of FIG. 1 may output a preview image transmitted from the camera 180 (e.g., an image configured with frames sampled from the video captured at the high speed). The processor 120 may analyze a preview image and may detect at least one object included in the preview image. In the shown drawing, an embodiment is exemplified as the three objects 801 to 803 of a specified level or more are located. The processor 120 may provide a screen such that a user selects objects included in a preview image and may determine an object to perform motion analysis or tracking according to a user input.

If the objects 801 to 803 are detected, the processor 120 may track the detected objects 801 to 803. In this operation, the processor 120 may assign identification information to each of the objects 801 to 803 and may track motion or movement of each of the objects 801 to 803 based on the assigned identification information. In the shown drawing, an embodiment is exemplified as objects progress in different directions and the processor 120 tracks the objects. According to various embodiments, although a plurality of objects moves in the same direction, the processor 120 may track each of the objects. The processor 120 may collect and store values for an amount of variation in motion or movement of each of the objects 801 to 803.

Figure 8B:
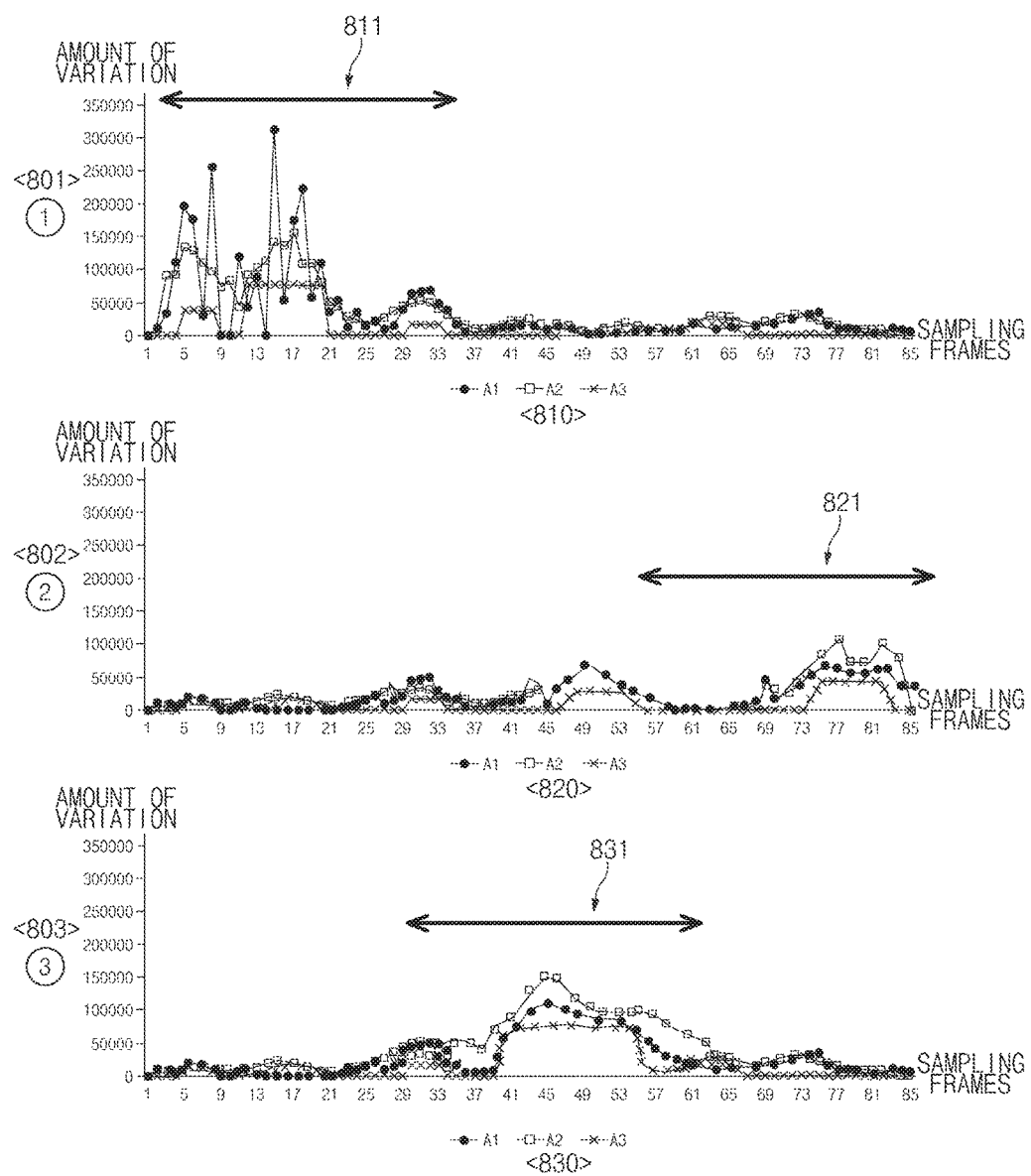
FIG. 8B is a drawing illustrating a process of providing video content for a plurality of objects according to an embodiment of the present disclosure.

FIG. 8B is a drawing illustrating a process of providing video content for a plurality of objects according to an embodiment of the present disclosure.

Referring to FIG. 8B, as described with reference to FIG. 8A, an electronic device 100 of FIG. 1 may store and manage information in which an amount of variation in motion of each of a plurality of objects is tracked. In this operation, a processor 120 of the electronic device 100 may classify an amount of variation in motion for each of objects and may classify and store frames having an amount of motion or movement variation of a specified level or more for each object. For example, the processor 120 may classify and store frames corresponding to an interval 811 where an amount of variation in motion or movement of a first object 801 is greater than or equal to a constant level on graph 810, frames corresponding to an interval 821 where an amount of variation in motion or movement of a second object 802 is greater than or equal to a constant level on graph 820, and frames corresponding to an interval 831 where an amount of variation in motion or movement of a third object 803 is greater than a constant level on graph 830.

In connection with classify and store the above-mentioned frames, the processor 120 may output a screen for selecting an object and may extract intervals where an amount of variation in motion or movement of an object selected by a user is greater than or equal to a specified level. The processor 120 may extract a constant number of intervals among intervals of a specified level or more and may generate a slow motion based on the extracted intervals. In this operation, the processor 120 may assign a score of intervals and may determine a sampling rate in response to a level of the assigned score (e.g., a length of an extension playback interval) (e.g., play back an interval of 240 frames per second as a four-second interval when ¼ time speed is set and play back 240 frames per second as an eight-second interval when ⅛ time speed is set). When playing back a one-second interval of 240 frames per second as a four-second interval, the processor 120 may extract 120 of 240 frames (play back 30 frames per second) and may divide 120 frames at intervals of 30 frames, thus playing back 120 frames for four seconds. When playing back 20 frames per second, the processor 120 may extract 80 of 240 frames and may divide the extracted 80 frames at intervals of 20 frames. The 240 frames may be changed to 480 frames, 1280 frames, or the like according to an image capture condition or a user input.

With respect to the shown drawing, if the first object 801 is larger than an amount of variation in motion or movement of a third object 803, the processor 120 may assign a sampling rate of a slow motion generated for interval 811 of the first object 801 to be higher than a sampling rate of a slow motion for interval 831 of the third object 803. Thus, an extension length of a playback time per second in the first object 801 may be applied to be longer than an extension length of a playback time per second in the third object 803. The processor 120 may separately store frames of intervals detected for each of the objects 801 to 803 and may output a slow motion image based on the stored interval frames when a user input occurs.

Figure 9A:
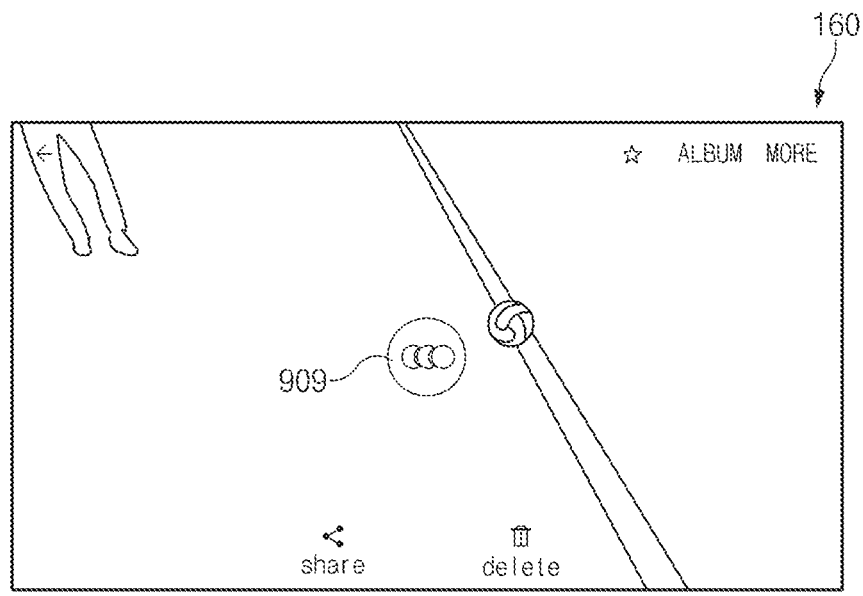
FIG. 9A is a drawing illustrating an example of an initial screen associated with a slow motion according to an embodiment of the present disclosure.

FIG. 9A is a drawing illustrating an example of an initial screen associated with a slow motion according to an embodiment of the present disclosure.

Figure 9B:
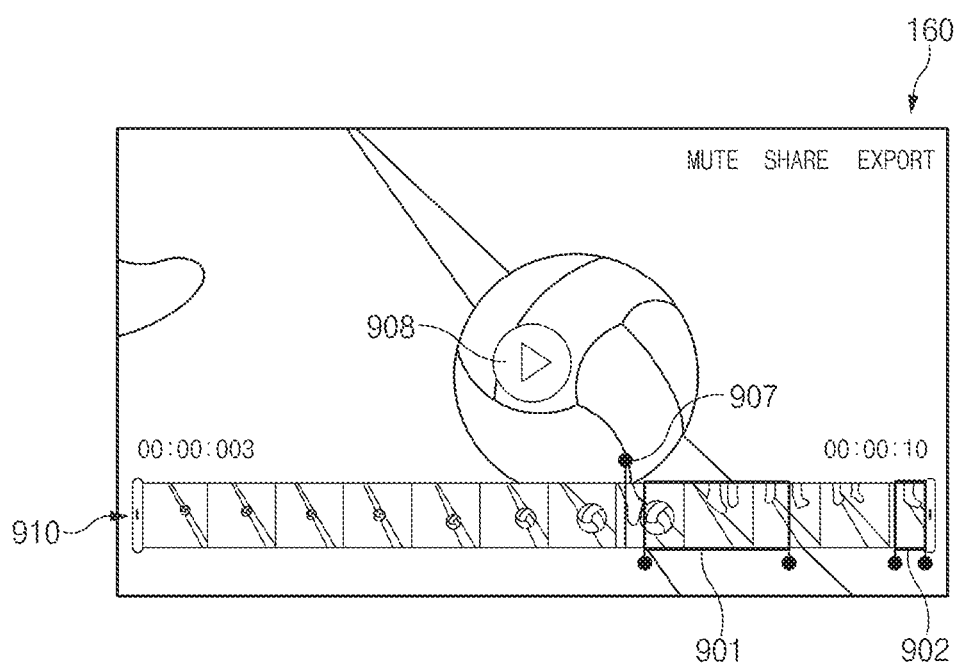
FIG. 9B is a drawing illustrating an example of a screen for providing a plurality of slow motions, according to an embodiment of the present disclosure.

FIG. 9B is a drawing illustrating an example of a screen for providing a plurality of slow motions, according to an embodiment of the present disclosure.

Figure 9C:
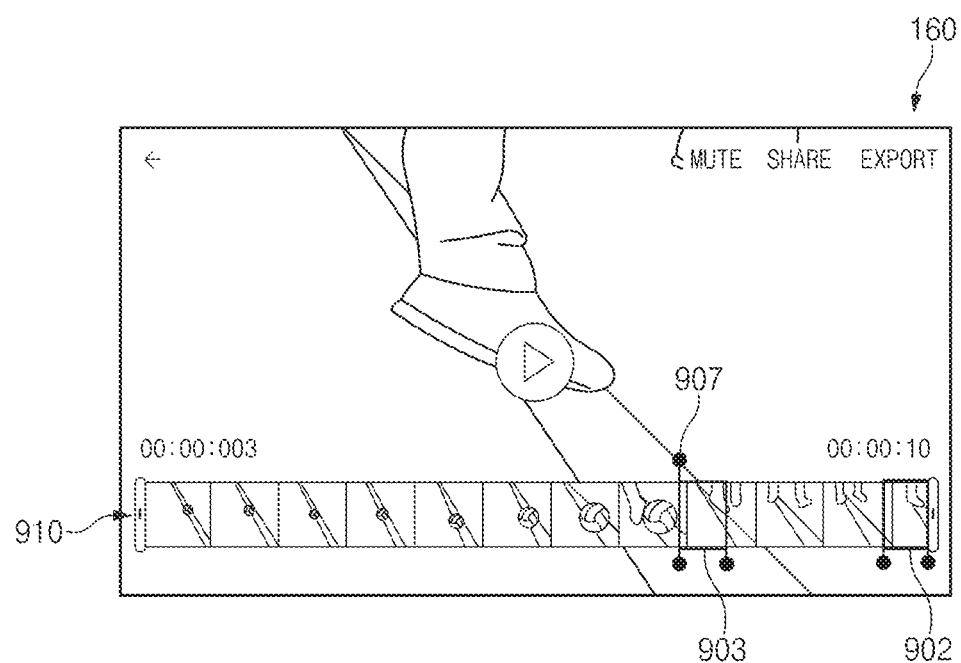
FIG. 9C is a drawing illustrating a process of editing a plurality of slow motions according to an embodiment of the present disclosure.

FIG. 9C is a drawing illustrating a process of editing a plurality of slow motions according to an embodiment of the present disclosure.

Referring to FIG. 9A, after a high-speed video is captured, if a user input signal for selecting video content to which a slow motion interval is applied occurs, as shown in FIG. 9A, a display 160 of an electronic device 100 of FIG. 1 may output an initial screen associated with the video content. In this regard, a processor 120 of the electronic device 100 may output an item (e.g., a thumbnail) corresponding to at least one video content including a slow motion interval. If an input signal (e.g., a touch input) for selecting the item is generated, the processor 120 may output an initial screen associated with video content corresponding to the selected item. The initial screen associated with the video content may be, for example, a screen corresponding to a first frame among frames included in the video content or a frame of a specified location.

Additionally or alternatively, the display 160 may at least one icon or a menu object 909 associated with editing a slow motion interval on a screen associated with video content which is being currently displayed. If an input signal for selecting the menu object 909 is generated, as shown in FIG. 9B, the processor 120 may output a screen associated with editing a slow motion interval. According to various embodiments, in a state where a screen associated with video content is displayed, if an input signal for touching the screen is generated, as shown in FIG. 9B, the processor 120 may output a screen for editing a slow motion interval.

Referring to FIG. 9B, the display 160 may output a playback object 908 associated with playing back video content and a playback bar 910 where consecutive frame regions corresponding to specified points of the video content are located. Alternatively, the frame regions included in the playback bar 910 may correspond to frames of a specific playback location included in video content. If an input (e.g., a touch input) for selecting a specific frame region occurs, the processor 120 may output a screen corresponding to the selected frame region.

According to an embodiment, the playback bar 910 may include a playback indication object 907 indicating a current playback location of video content and at least one slow motion interval guide objects 901 to 903. The playback indication object 907 may indicate a location corresponding to a frame displayed on a current screen of the display 160. Thus, if a location of the playback indication object 907 is changed, a frame corresponding to the changed location may be displayed on a screen of the display 160. Each of the slow motion interval guide objects 901 to 903 may include, for example, a box shape including at least some of frame regions. In the shown drawing, an embodiment is exemplified as the playback bar 910 includes the guide objects 901 to 903, each of which has the box shape, indicating two slow motion intervals. For example, as described above, after performing event assignment and scoring, the processor 120 may automatically generate a slow motion interval and may display the guide objects 901 to 903 corresponding to the generated slow motion interval on the playback bar 910.

The processor 120 may receive an input signal for operating the guide objects 901 to 903 (e.g., a touch drag for touching a constant point of a guide object and moving the touched location on the playback bar 910 (e.g., moving from side to side)). As shown in FIG. 9C, the processor 120 may adjust a size of a guide object in response to the received input signal.

Referring to FIG. 9C, the processor 120 may output the third guide object 903 on the playback bar 903 in response to a user input (e.g., a touch drag) corresponding to adjusting a size of the first guide object 901. The third guide object 903 may indicate a state where a slow motion interval is relatively more reduced than the previous first guide object 901. According to various embodiments, if a user input for extending the first guide object 901 occurs, the first guide object 901 may be extended. As described above, the processor 120 may extend or reduce a slow motion interval in response to a change of a guide object. According to an embodiment, when extending a guide object, the processor 120 may perform sampling or frame division using a high-speed video stored in a memory 130 of FIG. 1 (e.g., an image captured with 240 frames per second) and may extend a slow motion interval in response to the extension of the guide object. Alternatively, when reducing a guide object, the processor 120 may adjust sampling or frame division of a high-speed video and may generate a slow motion interval corresponding to a reduced guide object interval again. Alternatively, the processor 120 may change a playback time corresponding to a reduced size of a guide object.

According to an embodiment, if a guide object is configured to cover one frame region, the processor 120 may generate a slow motion interval to play back one frame for 8 seconds (e.g., play back 240 frames per second at intervals of 30 frames for 8 seconds). Alternatively, if a guide object is configured to cover two frame regions, the processor 120 may generate a slow motion interval to play back two frames for 8 seconds (or play back the two frames for 16 seconds). Alternatively, if a guide object is configured to include 1 frame and ½ frame, the processor 120 may perform frame division to play back one frame interval for 8 seconds and may generate a slow motion interval for playing back a frame region, where a half region is included in the guide object, for 4 seconds. Alternatively, the processor 120 may generate 120 of 240 frames per second as a four-second slow motion interval and may process 30 of the other 120 frames as a general playback interval by sampling the 30 of the other 120 frames (or extracting 30 frames, for example, generating 30 frames by extracting 1 frame per 4 frames). Therefore, the processor 120 may generate a slow motion interval for 12 seconds in response to the guide object including the 1 frame and ½ frame region.

As described above, various embodiments may automatically provide a slow motion associated with a meaningful interval of a video captured at a high speed and may edit a slow motion interval according to a user input.

Figure 10:
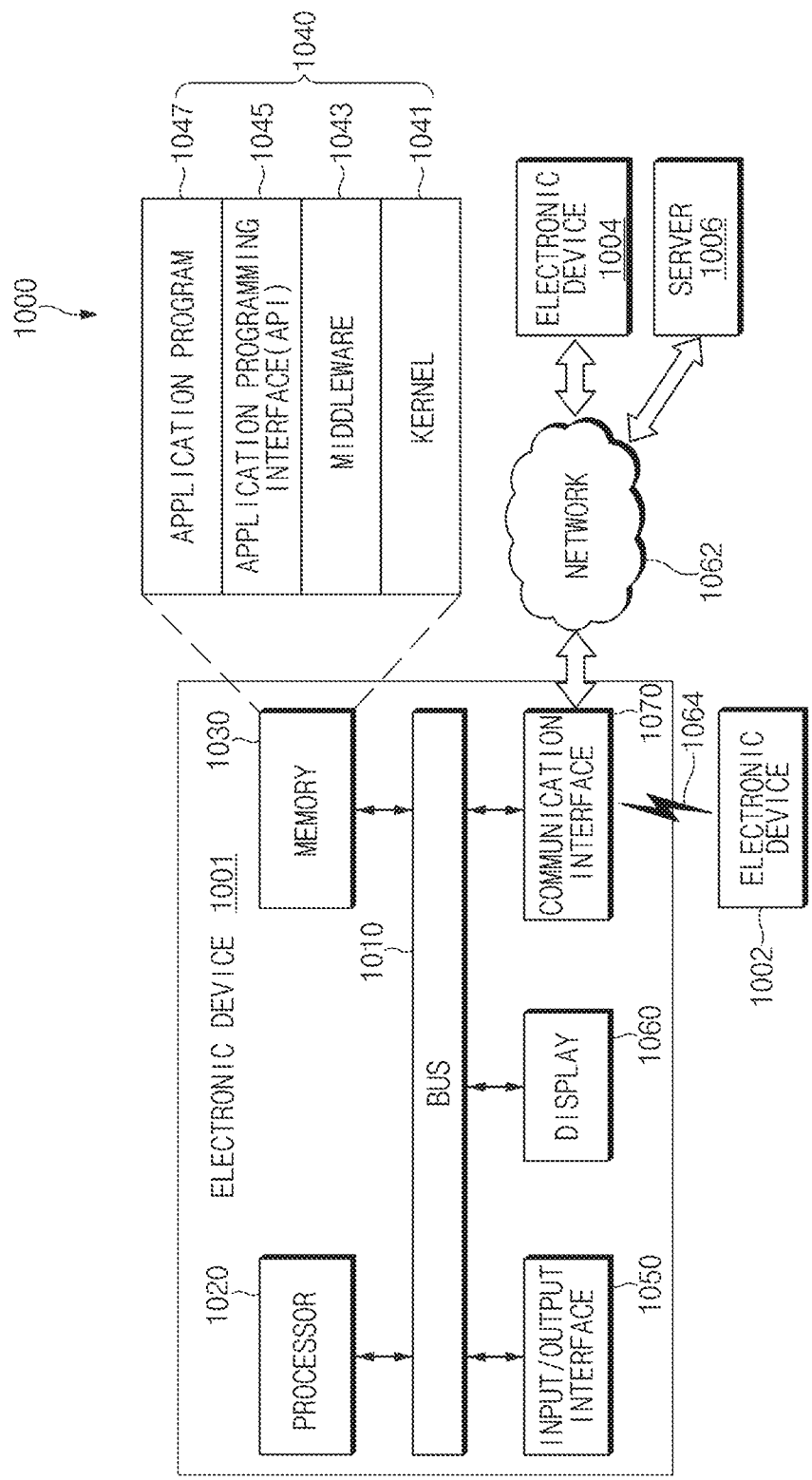
FIG. 10 is a block diagram illustrating a configuration of an electronic device in a network environment according to an embodiment of the present disclosure.

FIG. 10 is a block diagram 1000 illustrating a configuration of an electronic device in a network environment according to an embodiment of the present disclosure.

Referring to FIG. 10, in various embodiments, an electronic device 1001 and a first external electronic device 1002, a second external electronic device 1004, or a server 1006 may connect with each other through a network 1062 or local-area communication 1064. The electronic device 1001 may include a bus 1010, a processor 1020, a memory 1030, an input and output interface 1050, a display 1060, and a communication interface 1070. In various embodiments, at least one of the components may be omitted from the electronic device 1001, or other components may be additionally included in the electronic device 1001.

The bus 1010 may be, for example, a circuit which connects the components 1020 to 1070 with each other and transmits a communication signal (e.g., a control message and/or data) between the components.

The processor 1020 may include one or more of a CPU, an AP, or a communication processor (CP). For example, the processor 1020 may perform calculation or data processing about control and/or communication of at least another of the components of the electronic device 1001.

The memory 1030 may include a volatile and/or nonvolatile memory. The memory 1030 may store, for example, a command or data associated with at least another of the components of the electronic device 1001. According to an embodiment, the memory 1030 may store software and/or a program 1040. The program 1040 may include, for example, a kernel 1041, a middleware 1043, an application programming interface (API) 1045, and/or at least one application program 1047 (or "at least one application"), and the like. At least part of the kernel 1041, the middleware 1043, or the API 1045 may be referred to as an operating system (OS).

The kernel 1041 may control or manage, for example, system resources (e.g., the bus 1010, the processor 1020, or the memory 1030, and the like) used to execute an operation or function implemented in the other programs (e.g., the middleware 1043, the API 1045, or the application program 1047). Also, as the middleware 1043, the API 1045, or the application program 1047 accesses a separate component of the electronic device 1001, the kernel 1041 may provide an interface which may control or manage system resources.

The middleware 1043 may play a role as, for example, a go-between such that the API 1045 or the application program 1047 communicates with the kernel 1041 to communicate data.

Also, the middleware 1043 may process one or more work requests, received from the application program 1047, in order of priority. For example, the middleware 1043 may assign priority which may use system resources (the bus 1010, the processor 1020, or the memory 1030, and the like) of the electronic device 1001 to at least one of the at least one application program 1047. For example, the middleware 1043 may perform scheduling or load balancing for the one or more work requests by processing the one or more work requests in order of the priority assigned to the at least one of the at least one application program 1047.

The API 1045 may be, for example, an interface in which the application program 1047 controls a function provided from the kernel 1041 or the middleware 1043. For example, the API 1045 may include at least one interface or function (e.g., a command) for file control, window control, image processing, or text control, and the like.

The input and output interface 1050 may play a role as, for example, an interface which may transmit a command or data input from a user or another external device to another component (or other components) of the electronic device 1001. Also, input and output interface 1050 may output an instruction or data received from another component (or other components) of the electronic device 1001 to the user or the other external device.

The display 1060 may include, for example, a liquid crystal display (LCD), a light emitting diode (LED) display, an organic LED (OLED) display, a microelectromechanical systems (MEMS) display, or an electronic paper display. The display 1060 may display, for example, a variety of content (e.g., text, images, videos, icons, or symbols, and the like) to the user. The display 1060 may include a touch screen, and may receive, for example, touch, gesture, proximity, or a hovering input using an electronic pen or part of a body of the user.

The communication interface 1070 may establish communication between, for example, the electronic device 1001 and an external device (e.g., a first external electronic device 1002, a second external electronic device 1004, or a server 1006). For example, the communication interface 1070 may connect to a network 1062 through wireless communication or wired communication and may communicate with the external device (e.g., the second external electronic device 1004 or the server 1006).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1064. The local-area communication 1064 may include, for example, at least one of wireless-fidelity (Wi-Fi) communication, Bluetooth (BT) communication, near field communication (NFC), or global navigation satellite system (GNSS) communication, and the like.

An MST module may generate a pulse based on transmission data using an electromagnetic signal and may generate a magnetic field signal based on the pulse. The electronic device 1001 may output the magnetic field signal to a point of sales (POS) system. The POS system may restore the data by detecting the magnetic field signal using an MST reader and converting the detected magnetic field signal into an electric signal.

The GNSS may include, for example, at least one of a global positioning system (GPS), a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI) communication, recommended standard 232 (RS-232) communication, or plain old telephone service (POTS) communication, and the like. The network 1062 may include a telecommunications network, for example, at least one of a computer network (e.g., a local area network (LAN) or a wide area network (WAN)), the Internet, or a telephone network.

Each of the first and second external electronic devices 1002 and 1004 may be the same as or different device from the electronic device 1001. According to an embodiment, the server 1006 may include a group of one or more servers. According to various embodiments, all or some of operations executed in the electronic device 1001 may be executed in another electronic device or a plurality of electronic devices (e.g., the first external electronic device 1002, the second external electronic device 1004, or the server 1006). According to an embodiment, if the electronic device 1001 should perform any function or service automatically or according to a request, it may request another device (e.g., the first external electronic device 1002, the second external electronic device 1004, or the server 1006) to perform at least part of the function or service, rather than executing the function or service for itself or in addition to the function or service. The other electronic device (e.g., the first external electronic device 1002, the second external electronic device 1004, or the server 1006) may execute the requested function or the added function and may transmit the executed result to the electronic device 1001. The electronic device 1001 may process the received result without change or additionally and may provide the requested function or service. For this purpose, for example, cloud computing technologies, distributed computing technologies, or client-server computing technologies may be used.

Figure 11:
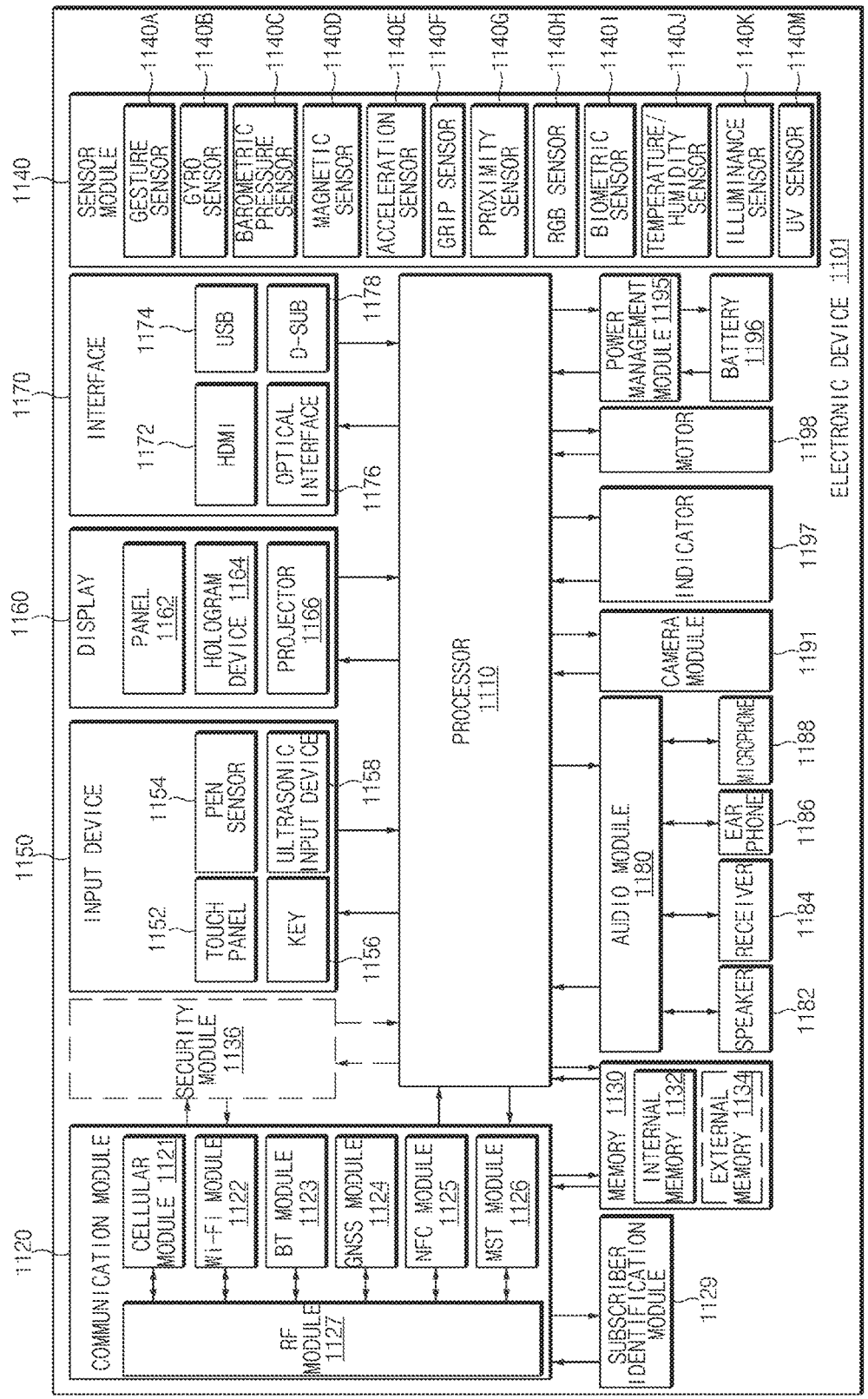
FIG. 11 is a block diagram illustrating a configuration of an electronic device according to an embodiment of the present disclosure.

FIG. 11 is a block diagram illustrating a configuration of an electronic device according to an embodiment of the present disclosure.

Referring to FIG. 11, the electronic device 1101 may include, for example, all or part of an electronic device 1001 shown in FIG. 10. The electronic device 1101 may include one or more processors 1110 (e.g., APs), a communication module 1120, a subscriber identification module (SIM) 1129, a memory 1130, a security module 1136, a sensor module 1140, an input device 1150, a display 1160, an interface 1170, an audio module 1180, a camera module 1191, a power management module 1195, a battery 1196, an indicator 1197, and a motor 1198.

The processor 1110 may drive, for example, an OS or an application program to control a plurality of hardware or software components connected thereto and may process and compute a variety of data. The processor 1110 may be implemented with, for example, a system on chip (SoC). According to an embodiment, the processor 1110 may include a GPU (not shown) and/or an image signal processor (not shown). The processor 1110 may include at least some (e.g., a cellular module 1121) of the components shown in FIG. 11. The processor 1110 may load a command or data received from at least one of other components (e.g., a non-volatile memory) into a volatile memory to process the data and may store various data in a non-volatile memory.

The communication module 1120 may have the same or similar configuration to a communication interface 1070 of FIG. 10. The communication module 1120 may include, for example, the cellular module 1121, a Wi-Fi module 1122, a BT module 1123, a GNSS module 1124 (e.g., a GPS module, a Glonass module, a Beidou module, or a Galileo module), a NFC module 1125, an MST module 1126, and a radio frequency (RF) module 1127.

The cellular module 1121 may provide, for example, a voice call service, a video call service, a text message service, or an Internet service, and the like through a communication network. According to an embodiment, the cellular module 1121 may identify and authenticate the electronic device 1101 in a communication network using the SIM 1129 (e.g., a SIM card). According to an embodiment, the cellular module 1121 may perform at least part of functions which may be provided by the processor 1110. According to an embodiment, the cellular module 1121 may include a CP.

The Wi-Fi module 1122, the BT module 1123, the GNSS module 1124, the NFC module 1125, or the MST module 1126 may include, for example, a processor for processing data transmitted and received through the corresponding module. According to various embodiments, at least some (e.g., two or more) of the cellular module 1121, the Wi-Fi module 1122, the BT module 1123, the GNSS module 1124, the NFC module 1125, or the MST module 1126 may be included in one integrated chip (IC) or one IC package.

The RF module 1127 may transmit and receive, for example, a communication signal (e.g., an RF signal). Though not shown, the RF module 1127 may include, for example, a transceiver, a power amplifier module (PAM), a frequency filter, or a low noise amplifier (LNA), or an antenna, and the like. According to another embodiment, at least one of the cellular module 1121, the Wi-Fi module 1122, the BT module 1123, the GNSS module 1124, the NFC module 1125, or the MST module 1126 may transmit and receive an RF signal through a separate RF module.

The SIM 1129 may include, for example, a card which includes a SIM and/or an embedded SIM. The SIM 1129 may include unique identification information (e.g., an integrated circuit card identifier (ICCID)) or subscriber information (e.g., an international mobile subscriber identity (IMSI)).

The memory 1130 (e.g., a memory 1030 of FIG. 10) may include, for example, an embedded memory 1132 or an external memory 1134. The embedded memory 1132 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1134 may include a flash drive, for example, a compact flash (CF), a secure digital (SD), a micro-SD, a mini-SD, an extreme digital (xD), a multimedia card (MMC), or a memory stick, and the like. The external memory 1134 may operatively and/or physically connect with the electronic device 1101 through various interfaces.

The secure module 1136 may be a module which has a relatively higher secure level than the memory 1130 and may be a circuit which stores secure data and guarantees a protected execution environment. The secure module 1136 may be implemented with a separate circuit and may include a separate processor. The secure module 1136 may include, for example, an embedded secure element (eSE) which is present in a removable smart chip or a removable SD card or is embedded in a fixed chip of the electronic device 1101. Also, the secure module 1136 may be driven by an OS different from the OS of the electronic device 1101. For example, the secure module 1136 may operate based on a java card open platform (JCOP) OS.

The sensor module 1140 may measure, for example, a physical quantity or may detect an operation state of the electronic device 1101, and may convert the measured or detected information to an electric signal. The sensor module 1140 may include at least one of, for example, a gesture sensor 1140A, a gyro sensor 1140B, a barometer sensor 1140C (e.g., a barometric pressure sensor), a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illumination sensor 1140K (e.g., an illuminance sensor), or an ultraviolet (UV) sensor 1140M. Additionally or alternatively, the sensor module 1140 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1140 may further include a control circuit for controlling at least one or more sensors included therein. According to various embodiments, the electronic device 1101 may further include a processor configured to control the sensor module 1140, as part of the processor 1110 or to be independent of the processor 1110. While the processor 1110 is in a sleep state, the electronic device 1101 may control the sensor module 1140.

The input device 1150 may include, for example, a touch panel 1152, a (digital) pen sensor 1154, a key 1156, or an ultrasonic input device 1158. The touch panel 1152 may use at least one of, for example, a capacitive type, a resistive type, an infrared type, or an ultrasonic type. Also, the touch panel 1152 may further include a control circuit. The touch panel 1152 may further include a tactile layer and may provide a tactile reaction to a user.

The (digital) pen sensor 1154 may be, for example, part of the touch panel 1152 or may include a separate sheet for recognition. The key 1156 may include, for example, a physical button, an optical key, or a keypad. The ultrasonic input device 1158 may allow the electronic device 1101 to detect a sound wave using a microphone (e.g., a microphone 1188) and to verify data through an input tool generating an ultrasonic signal.

The display 1160 (e.g., a display 1060 of FIG. 10) may include a panel 1162, a hologram device 1164, or a projector 1166. The panel 1162 may include the same or similar configuration to the display 160 or 1060. The panel 1162 may be implemented to be, for example, flexible, transparent, or wearable. The panel 1162 and the touch panel 1152 may be integrated into one module. The hologram device 1164 may show a stereoscopic image in a space using interference of light. The projector 1166 may project light onto a screen to display an image. The screen may be positioned, for example, inside or outside the electronic device 1101. According to an embodiment, the display 1160 may further include a control circuit for controlling the panel 1162, the hologram device 1164, or the projector 1166.

The interface 1170 may include, for example, a HDMI 1172, a USB 1174, an optical interface 1176, or a D-sub-miniature 1178. The interface 1170 may be included in, for example, a communication interface 1070 shown in 10. Additionally or alternatively, the interface 1170 may include, for example, a mobile high definition link (MHL) interface, an SD card/MMC card interface, or an infrared data association (IrDA) standard interface.

The audio module 1180 may convert a sound and an electric signal in dual directions. At least part of components of the audio module 1180 may be included in, for example, an input and output interface 1050 (or a user interface) shown in FIG. 10. The audio module 1180 may process sound information input or output through, for example, a speaker 1182, a receiver 1184, an earphone 1186, or the microphone 1188, and the like.

The camera module 1191 may be a device which captures a still image and a moving image. According to an embodiment, the camera module 1191 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1195 may manage, for example, power of the electronic device 1101. According to an embodiment, though not shown, the power management module 1195 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1196 and voltage, current, or temperature thereof while the battery 1196 is charged. The battery 1196 may include, for example, a rechargeable battery or a solar battery.

The indicator 1197 may display a specific state of the electronic device 1101 or part (e.g., the processor 1110) thereof, for example, a booting state, a message state, or a charging state, and the like. The motor 1198 may convert an electric signal into mechanical vibration and may generate vibration or a haptic effect, and the like. Though not shown, the electronic device 1101 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 12:
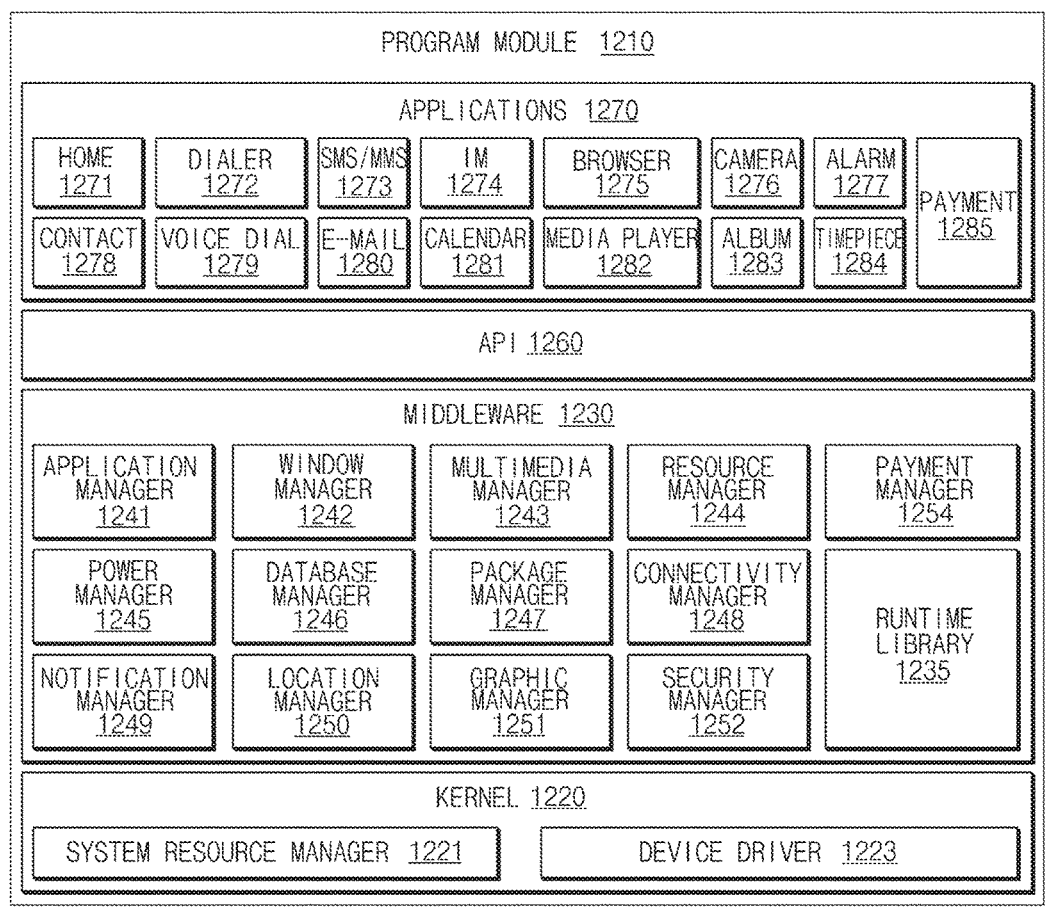
FIG. 12 is a block diagram illustrating a configuration of a program module according to an embodiment of the present disclosure.

FIG. 12 is a block diagram illustrating a configuration of a program module according to an embodiment of the present disclosure.

According to an embodiment, the program module 1210 (e.g., a program 1040 of FIG. 10) may include an OS for controlling resources associated with an electronic device (e.g., an electronic device 1001 of FIG. 10) and/or various applications (e.g., an application program 1047 of FIG. 10) which are executed on the OS. The OS may be, for example, Android, iOS, Windows, Symbian, Tizen, or Bada, and the like.

The program module 1210 may include a kernel 1220, a middleware 1230, an API 1260, and/or an application 1270. At least part of the program module 1210 may be preloaded on the electronic device, or may be downloaded from an external electronic device (e.g., a first external electronic device 1002, a second external electronic device 1004, or a server 1006, and the like of FIG. 10).

The kernel 1220 (e.g., a kernel 1041 of FIG. 10) may include, for example, a system resource manager 1221 and/or a device driver 1223. The system resource manager 1221 may control, assign, or collect, and the like system resources. According to an embodiment, the system resource manager 1221 may include a process management unit, a memory management unit, or a file system management unit, and the like. The device driver 1223 may include, for example, a display driver, a camera driver, a BT driver, a shared memory driver, a USB driver, a keypad driver, a Wi-Fi driver, an audio driver, or an inter-process communication (IPC) driver.

The middleware 1230 (e.g., a middleware 1043 of FIG. 10) may provide, for example, functions the application 1270 needs in common, and may provide various functions to the application 1270 through the API 1260 such that the application 1270 efficiently uses limited system resources in the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, a security manager 1252, or a payment manager 1254.

The runtime library 1235 may include, for example, a library module used by a compiler to add a new function through a programming language while the application 1270 is executed. The runtime library 1235 may perform a function about input and output management, memory management, or an arithmetic function.

The application manager 1241 may manage, for example, a life cycle of at least one of the application 1270. The window manager 1242 may manage graphic user interface (GUI) resources used on a screen of the electronic device. The multimedia manager 1243 may determine a format utilized for reproducing various media files and may encode or decode a media file using a codec corresponding to the corresponding format. The resource manager 1244 may manage source codes of at least one of the application 1270, and may manage resources of a memory or a storage space, and the like.

The power manager 1245 may act together with, for example, a basic input/output system (BIOS) and the like, may manage a battery or a power source, and may provide power information utilized for an operation of the electronic device. The database manager 1246 may generate, search, or change a database to be used in at least one of the application 1270. The package manager 1247 may manage installation or update of an application distributed by a type of a package file.

The connectivity manager 1248 may manage, for example, wireless connection such as Wi-Fi connection or BT connection, and the like. The notification manager 1249 may display or notify events, such as an arrival message, an appointment, and proximity notification, by a method which is not disturbed to the user. The location manager 1250 may manage location information of the electronic device. The graphic manager 1251 may manage a graphic effect to be provided to the user or a user interface (UI) related to the graphic effect. The security manager 1252 may provide all security functions utilized for system security or user authentication, and the like. According to an embodiment, when the electronic device (e.g., an electronic device 100 or 1001 of FIG. 1 or 10) has a phone function, the middleware 1230 may further include a telephony manager (not shown) for managing a voice or video communication function of the electronic device.

The middleware 1230 may include a middleware module which configures combinations of various functions of the above-described components. The middleware 1230 may provide a module which specializes according to kinds of OSs to provide a differentiated function. Also, the middleware 1230 may dynamically delete some of old components or may add new components.

The API 1260 (e.g., an API 1045 of FIG. 10) may be, for example, a set of API programming functions, and may be provided with different components according to OSs. For example, in case of Android or iOS, one API set may be provided according to platforms. In case of Tizen, two or more API sets may be provided according to platforms.

The application 1270 (e.g., an application program 1047 of FIG. 10) may include one or more of, for example, a home application 1271, a dialer application 1272, a short message service/multimedia message service (SMS/MMS) application 1273, an instant message (IM) application 1274, a browser application 1275, a camera application 1276, an alarm application 1277, a contact application 1278, a voice dial application 1279, an e-mail application 1280, a calendar application 1281, a media player application 1282, an album application 1283, a clock application 1284, a payment application 1285, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1270 may include an application (hereinafter, for better understanding and ease of description, referred to as "information exchange application") for exchanging information between the electronic device (e.g., the electronic device 1001 of FIG. 10) and an external electronic device (e.g., the first external electronic device 1002 or the second external electronic device 1004). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 1002 or the second external electronic device 1004). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 1002 or the second external electronic device 1004) which communicates with the electronic device, an application which operates in the external electronic device, or a service (e.g., a call service or a message service) provided from the external electronic device.

According to an embodiment, the application 1270 may include an application (e.g., the health card application of a mobile medical device) which is preset according to attributes of the external electronic device (e.g., the first external electronic device 1002 or the second external electronic device 1004). According to an embodiment, the application 1270 may include an application received from the external electronic device (e.g., the server 1006, the first external electronic device 1002, or the second external electronic device 1004). According to an embodiment, the application 1270 may include a preloaded application or a third party application which may be downloaded from a server. Names of the components of the program module 1210 according to various embodiments of the present disclosure may differ according to kinds of OSs.

According to various embodiments, at least part of the program module 1210 may be implemented with software, firmware, hardware, or at least two or more combinations thereof. At least part of the program module 1210 may be implemented (e.g., executed) by, for example, a processor (e.g., a processor 1020 of FIG. 10). At least part of the program module 1210 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a compact disc ROM (CD ROM), a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., ARM-based processors), a digital signal processor (DSP), a programmable logic device (PLD), an ASIC, a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
a memory configured to store a high-speed video captured with a first number of frames per second; and
a processor electrically connected with the memory and configured to:
detect an amount of image variation based on at least one frame of the high-speed video captured at the first number of frames per second,
generate a slow motion interval, a playback time of which is extended, by dividing the first number of frames per second into a second number of frames per second which is less than the first number of frames per second with respect to at least part of the high-speed video, wherein a number of frames per second in the slow motion interval generated by the division is less than the first number of frames per second, and
output the slow motion interval, the slow motion interval having less frames per second than the first number of frames per second, for display,
wherein the processor is further configured to:
detect candidate objects based on a preview image configured with some frames captured at the first number of frames per second,
display the candidate objects, and
detect an object selected by a user input among the candidate objects and generate the slow motion interval based on frames at times when the selected object has an amount of object variation of a level or more.

2. The electronic device of claim 1, further comprising:
a camera configured to capture a high-speed video with the first number of frames per second,
wherein the processor is further configured to:
while the camera captures the high-speed video, assign an event at a time when a captured frame has an amount of image variation of a level or more,
if the high-speed video capturing is ended, assign a score corresponding to an amount of image variation of at least one event,
calculate an interval where the assigned score meets a condition, and
generate the slow motion interval where the calculated interval is extended to a playback time.

3. The electronic device of claim 1, further comprising:
a camera configured to capture a high-speed video with the first number of frames per second, and
wherein the processor is further configured to:
if capturing operation of the camera is ended, perform a comparison between frames of the high-speed video and assign an event to frames having an amount of image variation of a level or more,
assign a score according to a level of an amount of image variation between the assigned events, and
generate the slow motion interval based on an interval where the assigned score meets a condition.

4. The electronic device of claim 1, wherein the processor is further configured to:
detect the amount of image variation based on a preview image configured with some frames captured at the first number of frames per second.

5. The electronic device of claim 1, wherein the processor is further configured to:
detect an object based on a preview image configured with some frames captured at the first number of frames per second,
track the detected object, and
detect an amount of object variation of a level or more based on the tracking of the detected object.

6. The electronic device of claim 1, wherein the processor is further configured to:
detect a plurality of objects in response to a user input from a preview image configured with some frames of the first number of frames per second, and
store frames classified at times when each of the plurality of detected objects has an amount of object variation of a level or more.

7. The electronic device of claim 1, wherein the processor is further configured to:

generate a number of slow motion intervals according to a user input or a specific scheduled setting.

8. The electronic device of claim 1, wherein the processor is further configured to:
adjust a level of the amount of image variation according to a user input or a specific scheduled setting, and
generate the slow motion interval based on events having an amount of image variation of the adjusted level or more.

9. The electronic device of claim 1, wherein the processor is further configured to:
detect a plurality of objects of a size or more, and
generate the slow motion interval based on an amount of variation between the plurality of detected objects of the size or more.

10. The electronic device of claim 1, wherein the processor is further configured to:
detect occurrence of a shake of the high-speed video, and
apply image correction according to the shake.

11. The electronic device of claim 1, wherein the processor is further configured to:
obtain information of motion or movement of the electronic device, and
detect the amount of image variation according to a direction and speed of the motion or movement.

12. The electronic device of claim 1, further comprising:
a display configured to display video content including the slow motion interval,
wherein the processor is further configured to:
display a playback bar indicating a playback location of the video content, and
output a guide object indicating the slow motion interval on the playback bar.

13. The electronic device of claim 12, wherein the processor is further configured to:
adjust a range of frames regions included in the guide object or a number of frame regions, in response to a user input.

14. The electronic device of claim 13, wherein the processor is further configured to:
generate a new slow motion interval in response to a change of the guide object.

15. The electronic device of claim 1, wherein the processor is further configured to edit a slow motion interval based on a touch input.

16. An electronic device, comprising:
a memory configured to store a high-speed video captured with a first number of frames per second; and
a processor electrically connected with the memory and configured to:
obtain information of an amount of image variation based on at least one frame of the high-speed video captured at the first number of frames per second,
detect a plurality of intervals where the amount of image variation having a level or more is continuous by a length,
generate a plurality of slow motion intervals, a playback time of which is extended, by dividing the first number of frames per second into a second number of frames per second which is less than the first number of frames per second, with respect to the plurality of detected intervals, wherein a number of frames per second in the slow motion interval generated by the division is less than the first number of frames per second, and
output the slow motion interval, the slow motion interval having less frames per second than the first number of frames per second, for display,
wherein the processor is further configured to:
detect candidate objects based on a preview image configured with some frames captured at the first number of frames per second,
display the candidate objects, and
detect an object selected by a user input among the candidate objects and generate the slow motion interval based on frames at times when the selected object has an amount of object variation of a level or more.

17. A method for providing video content, the method comprising:
obtaining information of an amount of image variation using some of a first number of frames per second from a high-speed video captured with the first number of frames per second;
detecting an interval having an amount of image variation which meets a condition;
generating a slow motion interval, a playback time of which is extended, by dividing the first number of frames per second into a second number of frames per second which is less than the first number of frames per second, with respect to the interval, wherein a number of frames per second in the slow motion interval generated by the division is less than the first number of frames per second; and
outputting the slow motion interval, the slow motion interval having less frames per second than the first number of frames per second, for display,
wherein the method further comprising:
detecting candidate objects based on a preview image configured with some frames captured at the first number of frames per second,
displaying the candidate objects, and
detecting an object selected by a user input among the candidate objects and generate the slow motion interval based on frames at times when the selected object has an amount of object variation of a level or more.

18. The method of claim 17, wherein the detecting of the amount of image variation comprises:
detecting an object included in frames of the high-speed video,
tracking the detected object, and
determining whether an amount of variation of a level or more occurs based on the tracking of the detected object.

19. The method of claim 17, wherein the detecting of the interval comprises:
assigning a score according to a level of the amount of image variation, and
detecting an interval having a score which meets a condition.

* * * * *